US011671974B2

(12) United States Patent
Lee et al.

(10) Patent No.: US 11,671,974 B2
(45) Date of Patent: Jun. 6, 2023

(54) SYSTEMS AND METHODS FOR DOWNLINK CONTROL INFORMATION FORMAT SIZING

(71) Applicant: QUALCOMM Incorporated, San Diego, CA (US)

(72) Inventors: Heechoon Lee, San Diego, CA (US); Peter Pui Lok Ang, San Diego, CA (US); Wanshi Chen, San Diego, CA (US); Huilin Xu, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 594 days.

(21) Appl. No.: 16/360,961

(22) Filed: Mar. 21, 2019

(65) Prior Publication Data
US 2019/0297604 A1    Sep. 26, 2019

Related U.S. Application Data

(60) Provisional application No. 62/647,593, filed on Mar. 23, 2018.

(51) Int. Cl.
*H04W 4/00*     (2018.01)
*H04W 72/23*    (2023.01)
(Continued)

(52) U.S. Cl.
CPC .......... *H04W 72/23* (2023.01); *H04L 5/0044* (2013.01); *H04L 5/0053* (2013.01);
(Continued)

(58) Field of Classification Search
None
See application file for complete search history.

(56) References Cited

U.S. PATENT DOCUMENTS

2012/0182950 A1* 7/2012 Chung .................. H04L 5/0053
                                                370/329
2013/0114532 A1* 5/2013 Choi ..................... H04L 5/0091
                                                370/329
(Continued)

FOREIGN PATENT DOCUMENTS

CN       106664517 A     5/2017
WO    WO-2017057989 A1   4/2017

OTHER PUBLICATIONS

Intel Corporation: "DCI Design Considerations for NR", 3GPP TSG-RAN WG1 #89, 3GPP Draft; R1-1707384, 3rd Generation Partnership Project (3GPP), Mobile Competence Centre, 650, Route Des Lucioles ; F-06921 Sophia-Antipolis Cedex, France, vol. RAN WG1, No. Hangzhou; May 15, 2017-May 19, 2017, May 14, 2017 (May 14, 2017), pp. 1-5, XP051272596, Retrieved from the Internet: URL: http://www.3gpp.org/ftp/Meetings_3GPP_SYNC/RAN1/ Docs/ [retrieved on May 14, 2017], Sections 2.1, 2.2, 2.2.1, 2.2.2.1, 3.

(Continued)

*Primary Examiner* — Zewdu A Beyen
(74) *Attorney, Agent, or Firm* — Qualcomm/Norton Rose Fulbright US LLP

(57) ABSTRACT

Systems and methods configured to provide size matching of downlink control information (DCI) formats to restrict a number of DCI format sizes for a set of DCI formats for concurrent use are described. In accordance with embodiments of the present disclosure, size matching at least two DCI formats of a set of DCI formats to restrict a number of DCI format sizes for the set of DCI formats for concurrent use is implemented. Restrictions with respect to the number of DCI format sizes for the set of DCI formats may correspond both to a first number of DCI sizes parameter based on a total number of DCI format sizes per wireless communication slot, and to a second number of DCI sizes (Continued)

parameter based on a total number of DCI format sizes for DCI formats used to carry DCI payload encoded using an identifier per wireless communication slot.

101 Claims, 5 Drawing Sheets

(51) Int. Cl.
    *H04L 5/00* (2006.01)
    *H04W 72/1268* (2023.01)
    *H04W 72/0446* (2023.01)
    *H04L 1/00* (2006.01)
    *H04W 72/20* (2023.01)

(52) U.S. Cl.
    CPC .......... *H04L 5/0082* (2013.01); *H04L 5/0091* (2013.01); *H04W 72/0446* (2013.01); *H04W 72/1268* (2013.01); *H04L 1/00* (2013.01); *H04L 5/001* (2013.01); *H04L 5/0064* (2013.01); *H04W 72/20* (2023.01)

(56) References Cited

U.S. PATENT DOCUMENTS

| | | | |
|---|---|---|---|
| 2014/0105164 | A1 | 4/2014 | Moulsley et al. |
| 2015/0264667 | A1* | 9/2015 | Lee .................... H04L 1/0046 370/329 |

OTHER PUBLICATIONS

Intel Corporation: "Remaining Issues on PDCCH Formats and Contents", 3GPP TSG-RAN WG1 Meeting #92, 3GPP Draft; R1-1802409, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Feb. 17, 2018 (Feb. 17, 2018), pp. 1-4, XP051397934, Retrieved from the Internet: URL: http://www.3gpp.org/ftp/tsg_ran/WG1_RL1/TSGR1_92/Docs/ [retrieved on Feb. 17, 2018], Sections 1, 2.1, 2.2.
International Search Report and Written Opinion—PCT/US2019/023521—ISA/EPO—dated Aug. 21, 2019.
Motorola: "PDCCH Design for Cross-Carrier Operation Using CIF", 3GPP TSG RAN WG1 Meeting #59, 3GPP Draft; R1-094830_PDCCH_CIF Final, 3rd Generation Partnership Project (3GPP), Mobile Competence Centre, 650, Route Des Lucioles; F-06921 Sophia-Antipolis Cedex, France, Nov. 9, 2019 (Nov. 9, 2019), pp. 1-3, XP050389225, URL: https://www.3gpp.org/ftp/tsg_ran/WG1_RL1/TSGR1_59/Docs/, Sections 1 and 2.
Vivo: "Remaining Details on DCI Content and Formats", 3GPP TSG RAN WG1 Meeting #92, 3GPP Draft; R1-1801533, 3rd Generation Partnership Project (3GPP), Mobile Competence Centre, 650, Route Des Lucioles; F-06921 Sophia-Antipolis Cedex, France, vol. RAN WG1,No. Athens, Greece; Feb. 26, 2018-Mar. 2, 2018, Feb. 15, 2018 (Feb. 15, 2018), 5 Pages, XP051396785, Retrieved from the Internet: URL: http://www.3gpp.org/ftp/tsg_ran/WG1_RL1/TSGR1_92/Docs/ [retrieved on Feb. 15, 2018], Sections 1, 2.1.
Taiwan Search Report—TW108109983—TIPO—dated Apr. 5, 2022.
CMCC: "Discussion on DCI Format Design", R1-1802042, 3GPP TSG RAN WG1 Meeting #92, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 16, 2018, XP051397138, 7 Pages, sections 1, 3.1, 3.2.
Ericsson: "Outcome of Offline Discussion on 7.3.1.4 (DCI content)—part I", TSG-RAN WG1 AdHoc 1801, R1-1801136, Outcome of Offline on 7.3.1.4 (DCI Content)—Part I, 3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 25, 2018, XP051385334, 2 Pages, section 2.
Ericsson: "Summary of 7.1.3.1.4 (DCI Contents and Formats)", TSG-RAN WG1 #92, R1-1803232, Summary of 7.1.3.1.4 (DCI Content), 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26-Mar. 2, 2018, Feb. 26, 2018, XP051398382, 19 Pages, The Whole Document, sections 2, 3, 12.1, 12.6, 12.8, 12.11, 12.14, 13.3.
Ericsson: "Summary of 7.3.1.4 (DCI Contents and Formats)", TSG-RAN WG1 AdHoc 1801, R1-1801012 Summary of 7.3.1.4 (DCI Content), 3rd Generation Partnership Project (3GPP), Mobile Competence Centre, 650, Route Des Lucioles, F-06921 Sophia-Antipolis Cedex, France, vol. RAN WG1, No. Vancouver, Canada; Jan. 22, 2018-Jan. 26, 2018, Jan. 23, 2018, 11 Pages, XP051385251, Default values, p. 1, Paragraph 5-p. 2, The Whole Document, sections 4, 8, 9.1, 9.4, 9.6-9.8, 9.10, 9.15.
Huawei., et al., "Remaining Issues on Scheduling, Feedback and Power Control for SUL", R1-1719415, 3GPP TSG RAN WG1 Meeting #91, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017, XP051369324, 8 Pages, sections 1, 2.1, 2.2.
Intel Corporation: "Remaining Details on TBS Determination and Resource Allocation", 3GPP TSG RAN WG1 Meeting #91, R1-1720094, Intel TBS_RA, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017, XP051369775, pp. 1-14, sections 3.1, 3.2, 4, 4.1-4.5.
Panasonic: "DCI Size Alignment in CSS", R1-1802506, 3GPP TSG RAN WG1 Meeting #92, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 16, 2018,XP051397300, pp. 1-4, sections 1, 2.
Qualcomm Incorporated: "Remaining Issues on BWP", 3GPP Draft, 3GPP TSG RAN WG1 Meeting AH 1801, R1-1800879_Remaining Issues on BWP, 3rd Generation Partnership Project (3GPP), Mobile Competence Centre, 650, Route Des Lucioles, F-06921 Sophia-A, vol. RAN WG1. No. Vancouver, Canada, Jan. 22, 2018-Jan. 26, 2018, Jan. 13, 2018, (Jan. 13, 2018), pp. 1-13, XP051385148, Paragraph [2.1.2]-Paragraph [2.1.3].
Samsung: "DCI Contents and Formats", 3GPP TSG RAN WG1 Meeting #92, R1-1801976 DCI Contents and Formats, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 20, 2018, XP051398350, pp. 1-6, sections 1, 2.
Vivo: "Remaining Issues on BWP Operation", 3GPP Draft, 3GPP TSG RAN WG1 Meeting #92, R1-1801544_Remaining Issues on BWP Operation—Final, 3rd Generation Partnership Project (3GPP), Mobile Competence Centre, 650, Route Des Lucioles, F-06921 Sophia-A, vol. RAN WG1. No. Athens, Greece, Feb. 26, 2018-Mar. 2, 2018, Feb. 15, 2018, (Feb. 15, 2018), 5 Pages, XP051396796, tables 1, 2, sections 1, 2.1.
LG Electronics: "Remaining Issues on NR LTE Coexistence", 3GPP TSG RAN WG1 Meeting #92 R1-1802221, Athens, Greece, Feb. 26-Mar. 2, 2018, Feb. 16, 2018, 5 Pages.
Qualcomm Incorporated: "Discussion on DCI Related Issues", 3GPP Draft, 3GPP TSG RAN WG1 Meeting #92bis, R1-1804800, 3rd Generation Partnership Project (3GPP), Mobile Competence Centre, 650, Route Des Lucioles, F-06921 Sophia-Antipolis Cedex, France, vol. Ran WG1, No. Sanya, China, Apr. 16, 2018- Apr. 20, 2018, Apr. 15, 2018 (Apr. 15, 2018), XP051427067, 8 Pages, Sections 1-5.

* cited by examiner

SYSTEMS AND METHODS FOR DOWNLINK CONTROL INFORMATION FORMAT SIZING

CROSS-REFERENCE TO RELATED APPLICATIONS

This application claims the benefit of U.S. Provisional Patent Application No. 62/647,593, entitled, "SYSTEMS AND METHODS FOR DOWNLINK CONTROL INFORMATION FORMAT SIZING," filed on Mar. 23, 2018, which is expressly incorporated by reference herein in its entirety as if fully set forth below and for all applicable purposes.

BACKGROUND

Field

Aspects of the present disclosure relate generally to wireless communication systems, and more particularly, to size matching downlink control information (DCI) formats that are configurable to be of different sizes, such as to restrict a number of DCI format sizes for a set of DCI formats for concurrent use.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

To support the demand for mobile broadband access, wireless technologies implemented by various wireless communications systems have provided appreciable flexibility with respect to resource allocation. Such flexibility, however, presents challenges with respect to the devices conducting the wireless communications determining the particular resource allocation configuration being used. Accordingly, downlink control information (DCI) has been utilized to carry detailed information (e.g., grants, transmission timing, resource block assignments, demodulation scheme, antenna beam information, etc.) with respect to resource allocation configurations. A number of different DCI formats may be provided, such as to accommodate the provision of different control information sets relevant to certain wireless communications scenarios. Various ones of the DCI formats may be of different sizes, such as to accommodate the different control information sets.

SUMMARY

In one aspect of the disclosure, a method of wireless communication using a plurality of downlink control information (DCI) formats is provided. The method of embodiments may include determining a set of DCI formats of the plurality of DCI formats for concurrent use during wireless communications, wherein DCI formats of the plurality of DCI formats are configurable to be of different sizes. The method of embodiments may also include size matching at least two DCI formats of the set of DCI formats that are configurable to be of different sizes to meet restrictions with respect to the number of DCI format sizes for concurrent use. The restrictions with respect to the number of DCI format sizes for concurrent use may restrict a number of DCI format sizes for the set of DCI formats for concurrent use to both a first number of DCI sizes parameter and a second number of DCI sizes parameter, wherein the first number of DCI sizes parameter is based on a total number of DCI format sizes per wireless communication slot, and wherein the second number of DCI sizes parameter is based on a total number of DCI format sizes for DCI formats used to carry DCI payload encoded using an identifier per wireless communication slot.

In an additional aspect of the disclosure, an apparatus configured for wireless communication using a plurality of downlink control information (DCI) formats is provided. The apparatus of embodiments may include means for determining a set of DCI formats of the plurality of DCI formats for concurrent use during wireless communications, wherein DCI formats of the plurality of DCI formats are configurable to be of different sizes. The apparatus of embodiments may also include means for size matching at least two DCI formats of the set of DCI formats that are configurable to be of different sizes to meet restrictions with respect to the number of DCI format sizes for concurrent use. The restrictions with respect to the number of DCI forma sizes for concurrent use may restrict a number of DCI format sizes for the set of DCI formats for concurrent use to both a first number of DCI sizes parameter and a second number of DCI sizes parameter, wherein the first number of DCI sizes parameter is based on a total number of DCI format sizes per wireless communication slot, and wherein the second number of DCI sizes parameter is based on a total number of DCI format sizes for DCI formats used to carry DCI payload encoded using an identifier per wireless communication slot.

In an additional aspect of the disclosure, a non-transitory computer-readable medium having program code recorded thereon for wireless communication using a plurality of downlink control information (DCI) formats may be provided. The program code of embodiments may include code to determine a set of DCI formats of the plurality of DCI formats for concurrent use during wireless communications, wherein DCI formats of the plurality of DCI formats are configurable to be of different sizes. The program code of embodiments may also include code to size match at least two DCI formats of the set of DCI formats that are configurable to be of different sizes to meet restrictions with respect to the number of DCI format sizes for concurrent use. The restrictions with respect to the number of DCI format sizes for concurrent use may restrict a number of DCI format sizes for the set of DCI formats for concurrent use to both a first number of DCI sizes parameter and a second number of DCI sizes parameter, wherein the first number of DCI sizes parameter is based on a total number of DCI format sizes per wireless communication slot, and wherein the second number of DCI sizes parameter is based on a total number of DCI format sizes for DCI formats used to carry DCI payload encoded using an identifier per wireless communication slot.

In an additional aspect of the disclosure, an apparatus configured for wireless communication using a plurality of downlink control information (DCI) formats is provided. The apparatus includes at least one processor, and a memory coupled to the processor. The processor of embodiments may be configured to determine a set of DCI formats of the plurality of DCI formats for concurrent use during wireless communications, wherein DCI formats of the plurality of DCI formats are configurable to be of different sizes. The processor of embodiments may also be configured to size match at least two DCI formats of the set of DCI formats that are configurable to be of different sizes to meet restrictions with respect to the number of DCI format sizes for concurrent use. The restrictions with respect to the number of DCI format sizes for concurrent use may restrict a number of DCI format sizes for the set of DCI formats for concurrent use to both a first number of DCI sizes parameter and a second number of DCI sizes parameter, wherein the first number of DCI sizes parameter is based on a total number of DCI format sizes per wireless communication slot, and wherein the second number of DCI sizes parameter is based on a total number of DCI format sizes for DCI formats used to carry DCI payload encoded using an identifier per wireless communication slot.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
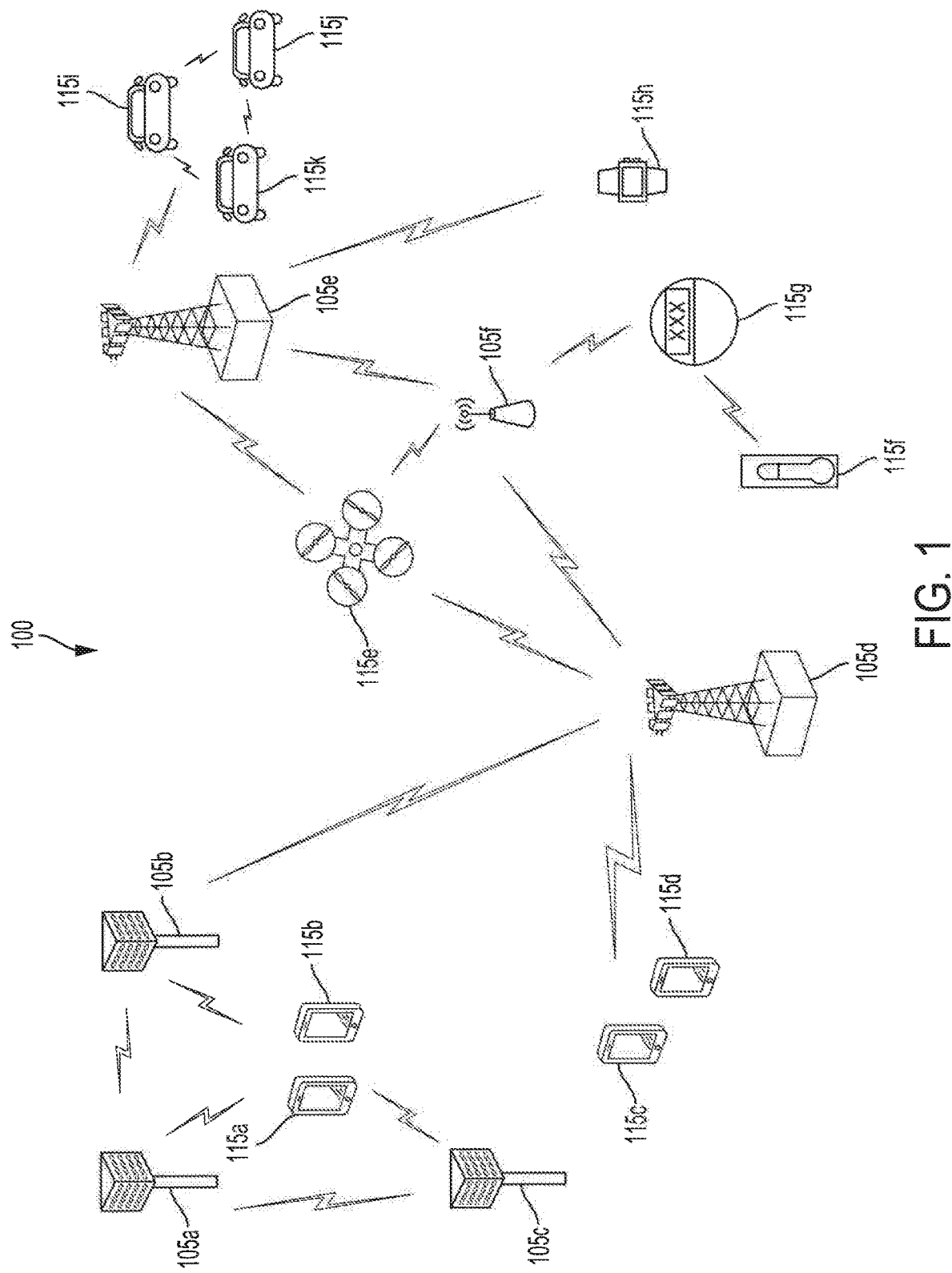
FIG. 1 is a block diagram illustrating details of a wireless communication system.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115*a*-115*d* are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115*e*-115*k* are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation of 5G network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through 5G network **100* either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. 5G network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
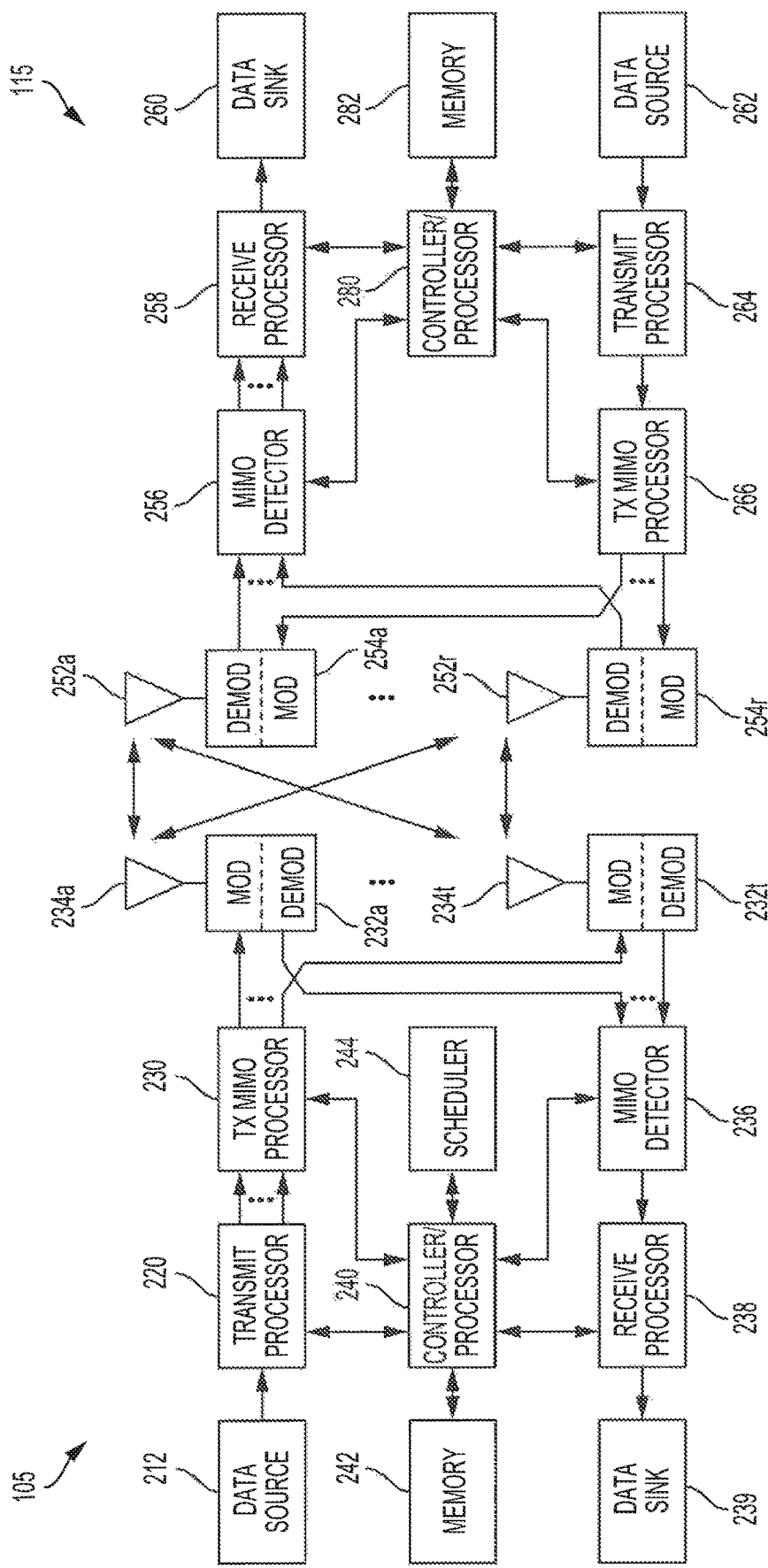
FIG. 2 is a block diagram illustrating a design of a base station and a UE configured according to aspects of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232*a* through 232*t* may be transmitted via the antennas 234*a* through 234*t*, respectively.

At the UE 115, the antennas 252*a* through 252*r* may receive the downlink signals from the base station 105 and may provide received signals to the demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254*a* through 254*r*, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254*a* through 254*r* (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 4, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
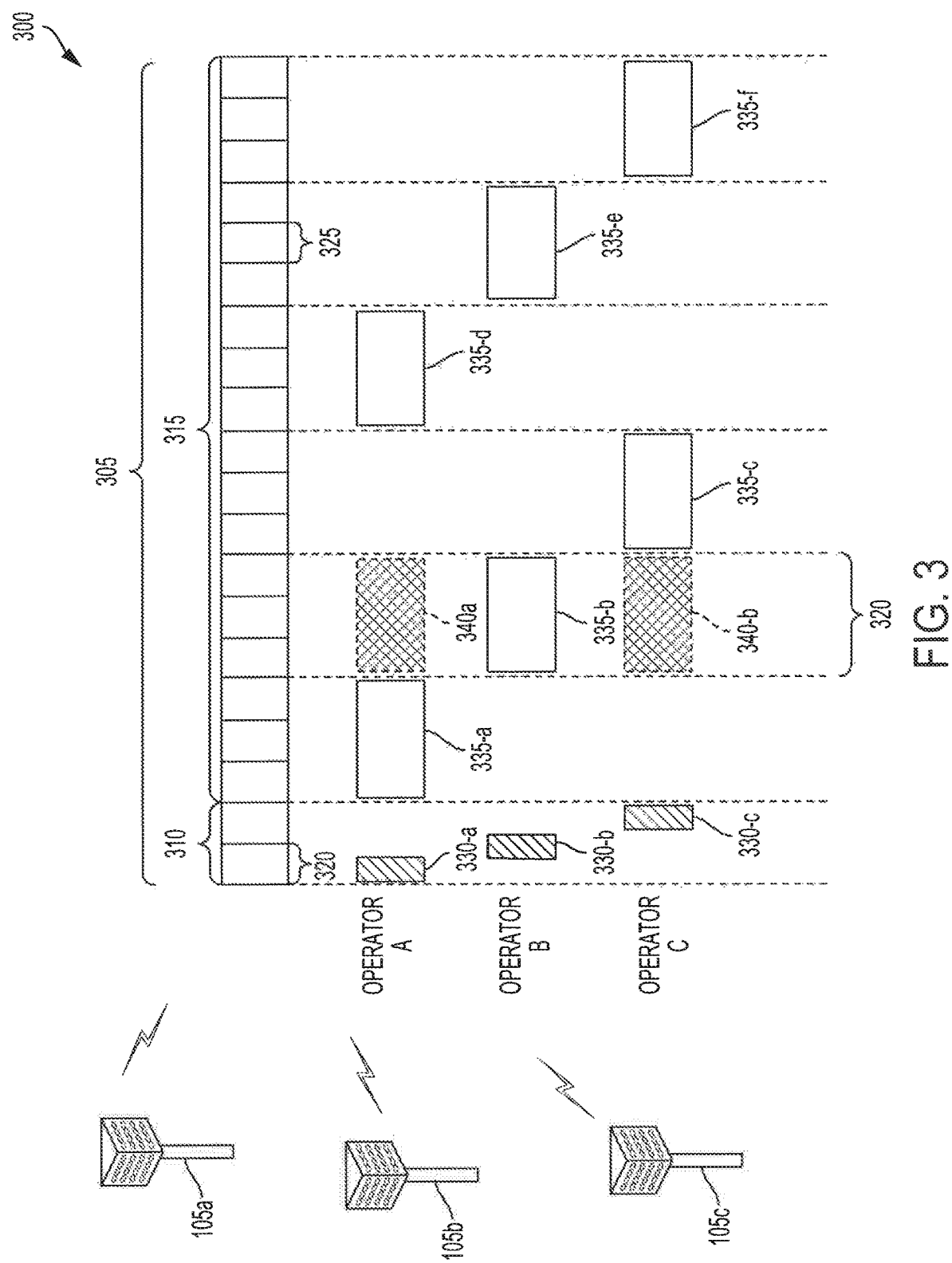
FIG. 3 illustrates an example of a timing diagram with respect to wireless communications provided by a wireless communication system according to aspects of the present disclosure.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear as staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use some resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a of a sub-interval 320 may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

As can be appreciated from the foregoing, the physical frame structure utilized by embodiments of 5G network 100 is quite flexible with regard to the possible ways in which resources may be allocated. Downlink control information (DCI) is therefore transmitted by base stations 105 of embodiments provide various control information (e.g., grants, transmission timing, resource block assignments, demodulation scheme, antenna beam information, etc.) to ones of the UEs 115 in wireless communication therewith. A number of different DCI formats may be supported to accommodate the provision of different control information sets.

Embodiments of 5G network 100 may, for example, support 8 DCI formats, designated 0-0, 0-1, 1-0, 1-1, 2-0, 2-1, 2-2, and 2-3. These DCI formats may comprise DCI formats used with respect to transmission of different data (e.g., transmission of payload data, control data, and combinations thereof), DCI formats used with respect to different communication links (e.g., uplink scheduling or downlink scheduling), DCI formats carrying variously encoded payload (e.g., DCI payload encoded with cell radio network temporary identifier (C-RNTI) information (C-RNTI DCI), and DCI not encoded with C-RNTI information (non-C-RNTI DCI)), DCI formats of different sizes (e.g., DCI formats having different DCI payload sizes with respect to other DCI formats, DCI formats having configurable DCI payload sizes, etc.), DCI formats received in different search spaces (e.g., DCI formats received in common search space (CSS), and DCI formats received in UE-specific search space (USS)), etc.

The computing resources utilized by a receiving device for detecting and decoding DCI increase with the number of possible different DCI format sizes that may be used with respect their wireless communications. For example, the complexity of UEs configured for blind decoding a number of different DCI formats having different DCI payload sizes can be quite high and require significant computing resources. Such increased complexity and utilization of computing resources may be problematic, even unsupportable, with respect to a number of mobile communication devices (e.g., battery powered mobile communication devices). Accordingly, embodiments of 5G network 100 impose restrictions upon the combinations of DCI formats (e.g., limiting the number of different sizes and/or types of DCI formats) utilized concurrently. Embodiments of the present disclosure enable meeting such DCI format restrictions by implementing techniques for size matching DCI formats that are configurable to be of different sizes to restrict a number of DCI format sizes for a set of DCI formats for concurrent use, as will be more fully explained below.

To aid in understanding the concepts of the present disclosure, an exemplary DCI format framework comprising DCI formats 0-0, 0-1, 1-0, 1-1, 2-0, 2-1, 2-2, and 2-3 is provided below. It should be appreciated that concepts herein with respect to size matching DCI formats that are configurable to be of different sizes to restrict a number of DCI format sizes for a set of DCI formats for concurrent use are applicable to other DCI format frameworks, such as may have different numbers of DCI formats, different restrictions upon the number of different sizes and/or types of DCI formats utilized concurrently, etc.

DCI formats 0-0 and 1-0 may, for example, provide fallback DCI formats that are monitored in CSS (e.g., in any carrier bandwidth part (BWP)), and that can be monitored in USS (e.g., in any BWP). In accordance with embodiments, DCI formats 0-0 (e.g., fallback downlink scheduling DCI) and 1-0 (e.g., fallback uplink scheduling DCI) may have a same size as with respect to each other. When monitoring for DCI in a BWP according to embodiments, the size of DCI formats 0-0/1-0 in CSS (regardless of RNTI) may be given by the initial downlink BWP and the size of DCI formats 0-0/1-0 in USS may be given by the active BWP as long as the DCI size budget is fulfilled, otherwise for DCI formats 0-0/1-0 in USS the size may be given by the initial downlink BWP.

Non-fallback DCI formats 0-1 and 1-1 may, for example, be received in USS (e.g., in any BWP) only. Radio resource control (RRC) signaling may be utilized to configure UEs with respect to monitoring DCI in the USS. For example, RRC signaling for the USS may configure a UE for monitoring DCI formats 0-1 and 1-1 only or for monitoring DCI formats 0-0 and 1-0 only in the USS.

The size of DCI formats 0-1 and 1-1 of embodiments may be given by the active carrier bandwidth part (BWP). That is, the resource allocation size for DCI formats 0-1 and 1-1 of embodiments is a function of the amount of available resources which is variable depending on the carrier bandwidth and which may vary with respect to the uplink and downlink. The size of fallback DCI formats 0-0 and 1-0 may be significantly smaller than the size of non-fallback DCI formats 0-1 (e.g., non-fallback downlink grant DCI) and 1-1 (e.g., non-fallback uplink grant DCI), each of which may have different sizes with respect to each other. That is, DCI formats 0-0/1-0, 0-1, and 1-1 may have different sizes.

DCI formats 2-0, 2-1, 2-2, and 2-3 may, for example, be received in CSS (e.g., in any BWP) only. DCI formats 2-0 (e.g., slot format indicator DCI) and 2-1 (e.g., pre-emption indicator DCI) may comprise configurable DCI formats to be used for notifying a group of UEs of the slot format and notifying a group of UEs of the PRB(s) and OFDM symbol(s) where UE may assume no transmission is intended for the UE, respectively. DCI formats 2-2 (e.g., transmit power control (TCP) DCI for PUCCH and PUSCH) and 2-3 (e.g., TPC/request DCI for SRS) may comprise DCI formats having the same size as the DCI format 0-0/1-0 to be used for scheduling RMSI/OSI, for Paging, and for random access. For example, DCI payload sizes for DCI formats 2-2 and 2-3 may be padded to match the size of DCI formats 0-0/1-0 as defined by the initial BWP.

DCI formats 0-0, 0-1, 1-0, and 1-1 of embodiments comprise C-RNTI DCI formats (e.g., are encoded with C-RNTI). DCI formats 2-0, 2-1, 2-2, and 2-3 of embodiments comprise non-C-RNTI DCI formats (e.g., are not encoded with C-RNTI, but with any configured control-resource set (CORESET) ID). Accordingly, DCI formats 0-0, 0-1, 1-0, and 1-1 and DCI formats 2-0, 2-1, 2-2, and 2-3 of this exemplary implementation provide a first DCI type and a second DCI type, respectively.

In accordance with the exemplary DCI format framework, for each search space configuration configured by UE-specific RRC signaling, the UE may be informed whether the search space configuration is CSS or USS as part of the search space configuration. Also, as part of the search space configuration, the UE may be provided with information regarding which DCI format(s) to monitor.

For example, where the search space configuration is CSS the UE may be provided information regarding one or more of DCI formats 0-0, 1-0, 2-0, 2-1, 2-2, and 2-3. With respect to DCI formats 0-0 and 1-0 in CSS, the UE may be provided with information facilitating the UE monitoring the DCI formats with cyclic redundancy check (CRC) scrambled by C-RNTI, configured set RNTI (CS-RNTI) (if configured), semi-persistent channel state information RNTI (SP-CSI-RNTI) (if configured), random access RNTI (RA-RNTI), temporary C-RNTI (TC-RNTI), paging RNTI (P-RNTI), or system information RNTI (SI-RNTI). With respect to DCI format 2-0, the UE may be provided with information facilitating the UE monitoring the DCI format with CRC scrambled by slot information indicator RNTI (SFI-RNTI), and with the SFI-related parameters SFI-PDCCH is provided as part of the search space configuration. With respect to DCI format 2-1, the UE may be provided with information facilitating the UE monitoring the DCI format with CRC scrambled by interruption RNTI (INT-RNTI), and with the PI-related parameters downlink preempting (Preemp-DL) is provided as part of the search space configuration. With respect to DCI format 2-2 the UE may be provided with information facilitating the UE monitoring the DCI format with CRC scrambled by transmit control power PUSCH RNTI (TPC-PUSCH-RNTI) or TPC-PUCCH-RNTI. With respect to DCI format 2-3 the UE may be provided with information facilitating the UE monitoring the DCI format with CRC scrambled by TCP sounding reference signal RNTI (TCP-SRS-RNTI). In operation according to embodiments, monitoring of multiple of the foregoing DCI formats can be configured for one CSS.

Where the search space configuration is USS the UE may be provided information regarding one or more of DCI formats 0-0, 0-1, 1-0, and 1-1. With respect to any of these DCI formats in USS the UE may be provided with information facilitating the UE monitoring the DCI format with CRC scrambled by C-RNTI, CS-RNTI (if configured), TC-RNTI (if a certain condition is met), and SP-CSI-RNTI (if configured). In operation according to embodiments, monitoring of multiple of the foregoing DCI formats can be configured for one USS.

The foregoing exemplary DCI format framework, comprising DCI formats 0-0, 0-1, 1-0, 1-1, 2-0, 2-1, 2-2, and 2-3, is summarized in Table 1 below. It can readily be appreciated from Table 1 that 6 DCI format sizing variations (shown as sizes 1-6 in the table columns) are defined for the 8 DCI formats. In the exemplary DCI format framework, size 1 (shown in the left most sizing variation column in Table 1) for DCI formats 0-0/1-0 with respect to the initial DL BWP, and thus for DCI formats 2-2 and 2-3, is mandatory for implementing the fallback DCI formats.

TABLE 1

| | Sizing Variation (given by BWP listed below) | | | | | |
|---|---|---|---|---|---|---|
| DCI format | 1 (initial DL BWP) C-RNTI and non-C-RNTI | 2 (active DL/UL BWP) C-RNTI | 3 (active UL BWP) C-RNTI | 4 (active DL BWP) C-RNTI | 5 (configurable) Non-C-RNTI (SFI-RNTI) | 6 (configurable) Non-C-RNTI (INT-RNTI) |
| 0-0 | CSS in any BWP | USS in any BWP | | | | |
| 0-1 | | | USS in any BWP | | | |
| 1-0 | CSS in any BWP | USS in any BWP | | | | |
| 1-1 | | | | USS in any BWP | | |
| 2-0 | | | | | CSS with any configured CORESET ID in any configured BWP | |
| 2-1 | | | | | | CSS with any configured CORESET ID in any configured BWP |

TABLE 1-continued

| | Sizing Variation (given by BWP listed below) | | | | | |
|---|---|---|---|---|---|---|
| DCI format | 1 (initial DL BWP) C-RNTI and non-C-RNTI | 2 (active DL/UL BWP) C-RNTI | 3 (active UL BWP) C-RNTI | 4 (active DL BWP) C-RNTI | 5 (configurable) Non-C-RNTI (SFI-RNTI) | 6 (configurable) Non-C-RNTI (INT-RNTI) |
| 2-2 | CSS with any configured CORESET ID in any configured BWP | | | | | |
| 2-3 | CSS with any configured CORESET ID in any configured BWP | | | | | |

As can be appreciated from the foregoing, the exemplary DCI format framework DCI defines a number of format sizing variations, which if all used concurrently, may be problematic with respect to blind decoding by many UE configurations. Accordingly, the exemplary DCI format framework as implemented according to embodiments restricts the number of DCI format sizes for a set of DCI formats for concurrent use (e.g., concurrently used in a same wireless communication slot, such as slots of subframes 325 within a superframe 305 as shown in timing diagram 300 of FIG. 3). For DCI formats of the same size, the UE may readily utilize parallel processing to decode the DCIs. Accordingly, by restricting the number of different DCI format sizes utilized in any particular slot, the complexity of the UE and the computing resources utilized for detecting and decoding DCI may be maintained at an reasonable level while the DCI decoding performance remains acceptable.

The restrictions with respect to the number of DCI format sizes for concurrent use implemented according to embodiments include restrictions to both a first number of DCI sizes parameter and a second number of DCI sizes parameter, wherein the first number of DCI sizes parameter is based on a total number of DCI format sizes per wireless communication slot, and wherein the second number of DCI sizes parameter is based on a total number of DCI format sizes for DCI formats used to carry DCI payload encoded using an identifier per wireless communication slot. As a specific example, the identifier used for encoding DCI payload may comprise a C-RNTI, the first number of DCI sizes parameter may establish that at most 4 different DCI sizes are monitored by the UE per slot, and the second number of DCI sizes parameter may establish that at most 3 different DCI sizes are monitored per C-RNTI per slot.

Figure 4:
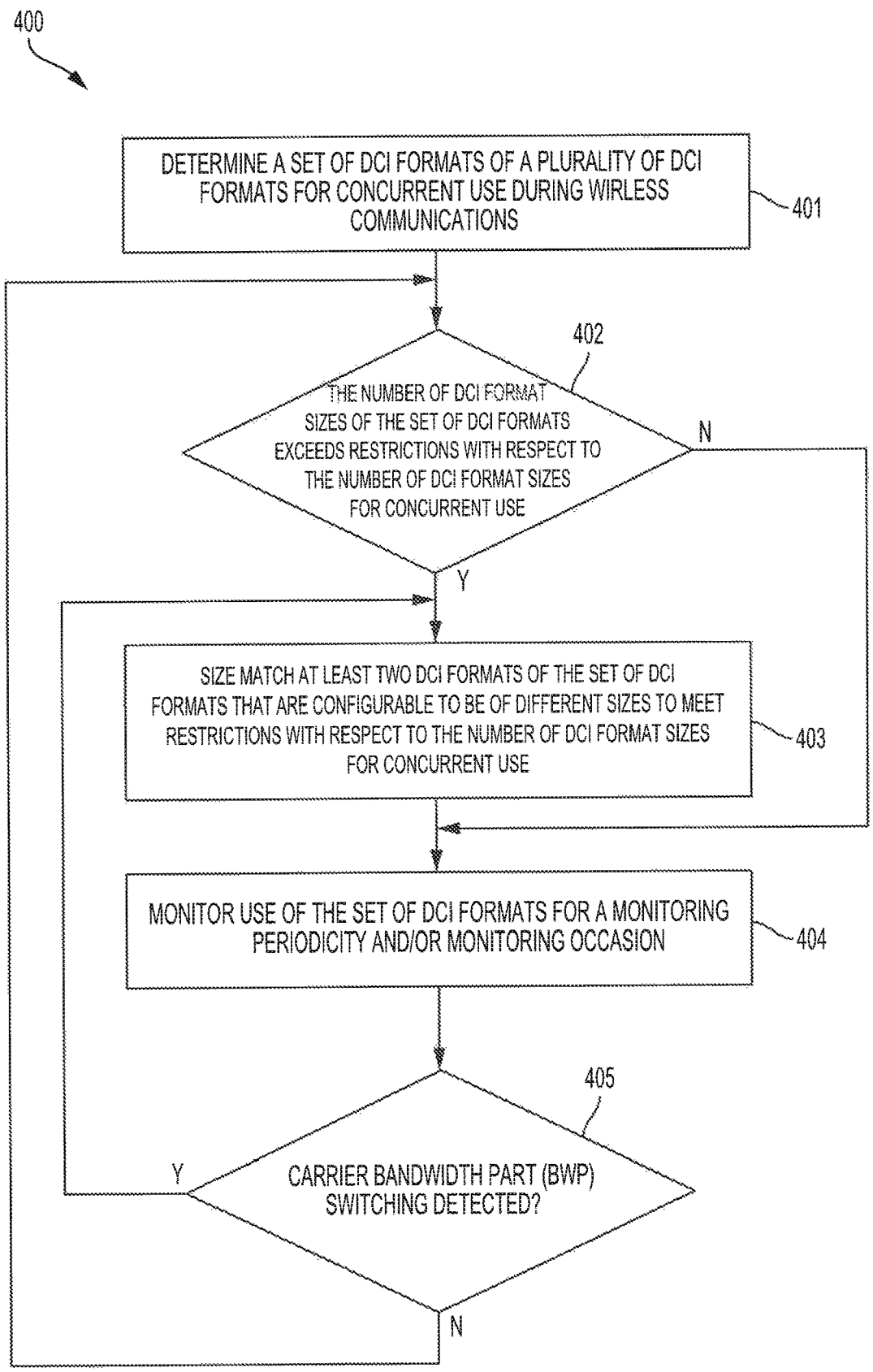
FIG. 4 is a flow diagram showing operation to perform downlink control information format size matching according to aspects of the present disclosure.

Operation to provide size matching of DCI formats to restrict a number of DCI format sizes for the set of DCI formats for concurrent use in accordance with embodiments of the present disclosure is shown in FIG. 4. In particular, FIG. 4 shows flow 400 comprising functional blocks as may be implemented by logic of controller/processor 240 of base station 105. For example, one or more instruction sets (and associated data) configured to implement the functional blocks of flow 400 when executed by controller/processor 240, may be stored by memory 242 for loading and execution by controller/processor 240 to provide operation as described herein.

In operation according to flow 400 of the illustrated embodiment, a set of DCI formats of a plurality of DCI formats for concurrent use during wireless communications are determined at block 401, wherein DCI formats of the plurality of DCI formats are configurable to be of different sizes. For example, the plurality of DCI formats (e.g., DCI formats 0-0, 0-1, 1-0, 1-1, 2-0, 2-1, 2-2, and 2-3) may provide a group of possible DCI formats for concurrent use, wherein a set of DCI formats (e.g., a subset of DCI formats selected from DCI formats 0-0, 0-1, 1-0, 1-1, 2-0, 2-1, 2-2, and 2-3) comprising a combination of DCI formats may be selected for DCI transmission in a particular wireless communication slot.

As discussed above, the DCI formats of the set of DCI formats may provide DCI payloads of different sizes. Accordingly, at block 402 of the embodiment illustrated in FIG. 4, a determination may be made as to whether the number of DCI format sizes of the set of DCI formats exceeds restrictions with respect to the number of DCI format sizes for concurrent use. For example, as described above for the exemplary DCI format framework, restrictions with respect to the number of DCI format sizes for concurrent use implemented may include restrictions to both a first number of DCI sizes parameter and a second number of DCI sizes parameter, wherein the first number of DCI sizes parameter is based on a total number of DCI format sizes per wireless communication slot, and wherein the second number of DCI sizes parameter is based on a total number of DCI format sizes for DCI formats used to carry DCI payload encoded using an identifier per wireless communication slot. The determination at block 402 of the illustrated embodiment, therefore, decides whether the number of DCI format sizes of the set of DCI formats exceeds one or more number of DCI sizes parameters (e.g., both the first number of DCI sizes parameter and the second number of DCI sizes parameter in the above example).

If it is determined at block 402 that restrictions with respect to the number of DCI format sizes for concurrent use are not exceeded (e.g., the one or more number of DCI sizes parameters are not exceeded), processing according to the illustrated embodiment of flow 400 proceeds to block 404 for monitoring use of the set of DCI formats, as is explained more fully below. However, if it is determined at block 402 that restrictions with respect to the number of DCI format sizes for concurrent use are exceeded (e.g., the one or more number of DCI sizes parameters are exceeded), processing according to the illustrated embodiment of flow 400 proceeds to block 403 for implementing restrictions upon the number of different DCI format sizes.

In implementing restrictions upon the number of different DCI format sizes at block 403 of the embodiment illustrated in FIG. 4, operation according to flow 400 of the illustrated embodiment size matches at least two DCI formats of the set of DCI formats that are configurable to be of different sizes to meet restrictions with respect to the number of DCI format sizes for concurrent use (e.g., DCI format sizes of at least two DCI formats of the set of DCI formats are size matched to restrict a number of DCI format sizes for the set of DCI formats for concurrent use to the one or more number of DCI format sizes parameters). For example, as described above for the exemplary DCI format framework, restrictions with respect to the number of DCI format sizes for concurrent use implemented may include restrictions to both a first number of DCI sizes parameter and a second number of DCI sizes parameter. Accordingly size matching provided in accordance with block 403 of embodiments may result in DCI format sizes for the set of DCI formats for concurrent use meeting both the first number of DCI sizes parameter (e.g., a number of DCI sizes parameter based on a total number of DCI format sizes per wireless communication slot) and the second number of DCI sizes parameter (e.g., a number of DCI sizes parameter based on a total number of DCI format sizes for DCI formats used to carry DCI payload encoded using an identifier per wireless communication slot).

The size matching performed according to embodiments of the present disclosure may provide size matching dynamically during the wireless communications. For example, dynamic size mapping may be provided with respect to BWP switching. Additionally or alternatively, dynamic size mapping may be provided with respect to changes in the set of DCI formats for concurrent use. Such dynamic size mapping may be implemented dynamically on a slot-by-slot basis. Dynamic size mapping may additionally or alternatively be based on a monitoring periodicity and/or monitoring occasion of a search space in which at least one DCI format of the set of DCI formats is searched. Dynamic size matching based on a monitored periodicity may, for example, provide size matching of DCI formats of the set of DCI formats based on a wireless communication slot in a monitoring period having a greatest number of DCI format sizes with respect to at least one of the first number of DCI sizes parameter and the second number of DCI sizes parameter.

At block 404 of the illustrated embodiment of flow 400 the use of the set of DCI formats is monitored for a monitoring periodicity (e.g., a configurable periodicity, such as a period of time, a number of slots, a number of superframes, etc.) and/or monitoring occasion (e.g., change of uplink or downlink BWP of sized matched DCI formats, change of one or more DCI formats of the set of DCI formats, etc.). Processing according to the illustrated embodiment may thus proceed from the monitoring of block 404, in accordance with the monitoring periodicity and/or upon the occurrence of a monitoring occasion.

At block 405 of flow 400 illustrated in FIG. 4, a determination is made as to whether BWP switching (e.g., a change of uplink or downlink BWP of sized matched DCI formats was detected) has occurred. If the requisite BWP switching is determined to have occurred at block 405, processing according to the illustrated embodiment returns to block 403 wherein size matching processing is repeated for DCI format sizes for the set of DCI formats to properly correspond to the switched BWP. If the requisite BWP switching has not determined to have occurred at block 405, processing according to the illustrated embodiment returns to block 402 wherein a determination is made regarding the set of DCI formats remaining in conformance with the one or more number of DCI sizes parameters. Accordingly, if the set of DCI formats has changed, resulting in the number of DCI format sizes exceeding one or more number of DCI sizes parameters, processing may return to block 403 wherein size matching processing is performed with respect to the set of DCI formats.

Having described operation to provide size matching of DCI formats to restrict a number of DCI format sizes for the set of DCI formats for concurrent use in accordance with embodiments of the present disclosure, examples of DCI format size matching implemented with respect to exemplary sets of DCI formats (e.g., in accordance with block 403 of FIG. 4) are provided in Tables 2-5 that follow. In each of the examples of Tables 2-5, the possible DCI formats for concurrent use comprises DCI formats 0-0, 0-1, 1-0, 1-1, 2-0, 2-1, 2-2, and 2-3, the first number of DCI sizes parameter provides for at most 4 different DCI sizes are monitored by the UE per slot, and the second number of DCI sizes parameter provides for at most 3 different DCI sizes are monitored per C-RNTI per slot. The particular examples given are to aid in understanding concepts of the present disclosure and are not intended to be limiting (e.g., with respect to the sets of DCI formats, the particular number of DCI sizes parameters used for restricting the number of DCI format sizes, or the DCI formats for which size matching may be performed).

In the first example of DCI format size matching, shown in Table 2 below, the set of DCI formats selected for concurrent use (as indicated by emphasis in bold in Table 2) comprise DCI formats 0-0, 1-0, 2-0, 2-1, 2-2, and 2-3 in CSS and DCI formats 0-1 and 1-1 in USS. Referring to Table 1 above, without DCI format size matching the foregoing set of DCI formats would have 5 DCI format sizes (i.e., DCI format sizes 1, 3, 4, 5, and 6), which exceeds the first number of DCI sizes parameter providing for at most 4 different DCI sizes are monitored by the UE per slot. Moreover, as can be seen in Tables 1 and 2, the foregoing set of DCI formats has 3 DCI sizes per C-RNTI slot (i.e., DCI format sizes 1, 3, and 4), which does not exceed the second number of DCI sizes parameter providing for at most 3 different DCI sizes are monitored per C-RNTI per slot. Accordingly, in operation of DCI matching logic of an embodiment, 2 DCI format sizes of the set of DCI formats are to be combined to meet the first number of DCI sizes parameter, wherein the DCI format sizes combined may either be DCI formats for C-RNTI DCI or non-C-RNTI DCI to meet the second number of DCI sizes parameter. In the example of Table 2, the DCI format sizes for DCI formats 2-0 and 2-1 are matched to provide the set of DCI formats having a total of 4 DCI sizes and 3 C-RNTI DCI sizes. Various techniques for implementing the size matching of DCI formats, as may be utilized in size matching DCI formats 2-0 and 2-1 of this example, are descried below. It should be appreciated that, if the downlink or uplink BWP switches, the size of DCI formats 2-0 and 2-1 may change and thus embodiments may dynamically size match DCI formats of the set of DCI formats with respect to BWP switching.

TABLE 2

| | Sizing Variation (given by BWP listed below) | | | |
|---|---|---|---|---|
| DCI format | 1 (initial DL BWP) C-RNTI and non-C-RNTI | 3 (active UL BWP) C-RNTI | 4 (active DL BWP) C-RNTI | 5 = 6 (configurable) Non-C-RNTI |
| 0-0 | CSS in any BWP | | | |
| 0-1 | | USS in any BWP | | |
| 1-0 | CSS in any BWP | | | |
| 1-1 | | | USS in any BWP | |
| 2-0 | | | | CSS with any configured CORESET ID in any configured BWP |
| 2-1 | | | | SS with any configured CORESET ID in any configured BWP |
| 2-2 | CSS with any configured CORESET ID in any configured BWP | | | |
| 2-3 | CSS with any configured CORESET ID in any configured BWP | | | |

In the second example of DCI format size matching, shown in Table 3 below, the set of DCI formats selected for concurrent use (as indicated by emphasis in bold in Table 3) comprise DCI formats 0-0, 1-0, 2-0, 2-1, 2-2, and 2-3 in CSS and DCI formats 0-0, 0-1, 1-0, and 1-1 in USS. Referring to Table 1 above, without DCI format size matching the foregoing set of DCI formats would have 6 DCI format sizes (i.e., DCI format sizes 1, 2, 3, 4, 5, and 6), which exceeds the first number of DCI sizes parameter providing for at most 4 different DCI sizes are monitored by the UE per slot. Moreover, as can be seen in Table 1 above, without DCI format size matching the foregoing set of DCI formats has 4 DCI sizes per C-RNTI slot (i.e., DCI format sizes 1, 2, 3, and 4), which exceeds the second number of DCI sizes parameter providing for at most 3 different DCI sizes are monitored per C-RNTI per slot. Accordingly, in operation of DCI matching logic of an embodiment, 2 groups of 2 DCI format sizes of the set of DCI formats are to be combined to meet the first number of DCI sizes parameter, wherein the DCI format sizes combined includes at least 2 DCI format sizes of DCI formats for C-RNTI DCI being size matched to meet the second number of DCI sizes parameter. In the example of Table 3, the DCI format sizes for DCI formats 0-1 and 1-1 are matched and the DCI format sizes for DCI formats 2-0 and 2-1 are matched to provide the set of DCI formats having a total of 4 DCI sizes and 3 C-RNTI DCI sizes (the DCI format sizes for DCI formats 0-0 and 1-0 in USS are size matched in this example for providing fallback DCI formats consistent with the exemplary DCI format framework discussed above). Various techniques for implementing the size matching of DCI formats, as may be utilized in size matching DCI formats 0-0 and 1-0, DCI formats 0-1 and 1-1, and DCI formats 2-0 and 2-1 of this example, are descried below. It should be appreciated that, if the downlink or uplink BWP switches, the size of DCI formats 0-1 and 1-1 and/or DCI formats 2-0 and 2-1 may change and thus embodiments may dynamically size match DCI formats of the set of DCI formats with respect to BWP switching.

TABLE 3

| | Sizing Variation (given by BWP listed below) | | | | |
|---|---|---|---|---|---|
| DCI format | 1 (initial DL BWP) C-RNTI and non-C-RNTI | 2 (active DL/UL BWP) C-RNTI | 3 = 4, or 3 only or 4 only (active DL/UL BWP) C-RNTI | 5 = 6 (configurable) Non-C-RNTI | |
| 0-0 | CSS in any BWP | USS in any BWP | | | |
| 0-1 | | | USS in any BWP | | |
| 1-0 | CSS in any BWP | USS in any BWP | | | |
| 1-1 | | | USS in any BWP | | |
| 2-0 | | | | CSS with any configured CORESET ID in any configured BWP | |
| 2-1 | | | | SS with any configured CORESET ID in any configured BWP | |

TABLE 3-continued

| | Sizing Variation (given by BWP listed below) | | | |
|---|---|---|---|---|
| DCI format | 1 (initial DL BWP) C-RNTI and non-C-RNTI | 2 (active DL/UL BWP) C-RNTI | 3 = 4, or 3 only or 4 only (active DL/UL BWP) C-RNTI | 5 = 6 (configurable) Non-C-RNTI |
| 2-2 | CSS with any configured CORESET ID in any configured BWP | | | |
| 2-3 | CSS with any configured CORESET ID in any configured BWP | | | |

In the third example of DCI format size matching, shown in Table 4 below, the set of DCI formats selected for concurrent use (as indicated by emphasis in bold in Table 4) comprise DCI formats 0-0, 1-0, 2-0, 2-1, 2-2, and 2-3 in CSS and DCI formats 0-1 and 1-1 in USS. Referring to Table 1 above, without DCI format size matching the foregoing set of DCI formats would have 5 DCI format sizes (i.e., DCI format sizes 1, 3, 4, 5, and 6), which exceeds the first number of DCI sizes parameter providing for at most 4 different DCI sizes are monitored by the UE per slot. Moreover, as can be seen in Table 1 above, without DCI format size matching the foregoing set of DCI formats has 3 DCI sizes per C-RNTI slot (i.e., DCI format sizes 1, 3, and 4), which does not exceed the second number of DCI sizes parameter providing for at most 3 different DCI sizes are monitored per C-RNTI per slot. Accordingly, in operation of DCI matching logic of an embodiment, 2 DCI format sizes of the set of DCI formats are to be combined to meet the first number of DCI sizes parameter, wherein the DCI format sizes combined may either be DCI formats for C-RNTI DCI or non-C-RNTI DCI to meet the second number of DCI sizes parameter. In the example of Table 4, the DCI format sizes for DCI formats 0-1 and 1-1 are matched to provide the set of DCI formats having a total of 4 DCI sizes and 2 C-RNTI DCI sizes. Various techniques for implementing the size matching of DCI formats, as may be utilized in size matching DCI formats 0-1 and 1-1 of this example, are descried below. It should be appreciated that, if the downlink or uplink BWP switches, the size of DCI formats 0-1 and 1-1 may change and thus embodiments may dynamically size match DCI formats of the set of DCI formats with respect to BWP switching.

TABLE 4

| | Sizing Variation (given by BWP listed below) | | | |
|---|---|---|---|---|
| DCI format | 1 (initial DL BWP) C-RNTI and non-C-RNTI | 3 = 4, or 3 only or 4 only (active DL/UL BWP) C-RNTI | 5 (configurable) Non-C-RNTI (SFI-RNTI) | 6 (configurable) Non-C-RNTI (INT-RNTI) |
| 0-0 | CSS in any BWP | | | |
| 0-1 | | USS in any BWP | | |
| 1-0 | CSS in any BWP | | | |
| 1-1 | | USS in any BWP | | |
| 2-0 | | CSS with any configured CORESET ID in any configured BWP | | |
| 2-1 | | | | SS with any configured CORESET ID in any configured BWP |
| 2-2 | CSS with any configured CORESET ID in any configured BWP | | | |
| 2-3 | CSS with any configured CORESET ID in any configured BWP | | | |

In the fourth example of DCI format size matching, shown in Table 5 below, the set of DCI formats selected for concurrent use (as indicated by emphasis in bold in Table 5) comprise DCI formats 0-0, 1-0, 2-0, 2-1, 2-2, and 2-3 in CSS and DCI formats 0-0 and 1-0 in USS. Referring to Table 1 above, without DCI format size matching the foregoing set of DCI formats would have 4 DCI format sizes (i.e., DCI format sizes 1, 2, 5, and 6), which does not exceed the first number of DCI sizes parameter providing for at most 4 different DCI sizes are monitored by the UE per slot. Moreover, as can be seen in Tables 1 and 5, the foregoing set of DCI formats has 2 DCI sizes per C-RNTI slot (i.e., DCI format sizes 1, 2, 3, and 4), which does not exceed the second number of DCI sizes parameter providing for at most 3 different DCI sizes are monitored per C-RNTI per slot. Accordingly, in operation of DCI matching logic of an embodiment, no DCI format sizes of the set of DCI formats are to be combined to meet the first number of DCI sizes parameter or the second number of DCI sizes parameter.

matching may, for example, be used for size matching between DCI formats 0-1 and 1-1 and/or between DCI formats 2-0 and 2-1.

In an example of size matching based on configured DCI format sizes, dynamic size matching may be based on a configured DCI size for the set of DCI formats when the set of DCI formats comprises a total number of DCI format sizes for DCI formats used to carry DCI payload encoded using an identifier per wireless communication slot greater than the second number of DCI sizes parameter or when the set of DCI formats comprises a total number of DCI format sizes per wireless communication slot greater than the first number of DCI sizes parameter. Configured DCI format sizes for dynamic size matching may, for example, be used for size matching between DCI formats 0-1 and 1-1 and/or between DCI formats 2-0 and 2-1.

As an example of size matching based on initial BWP, a resource allocation (RA) size of a first DCI format may be size matched to a RA size of a second DCI format of the DCI

TABLE 5

| | Sizing Variation (given by BWP listed below) | | | |
|---|---|---|---|---|
| DCI format | 1 (initial DL BWP) C-RNTI and non-C-RNTI | 2 (active DL/UL BWP) C-RNTI | 5 (configurable) Non-C-RNTI (SFI-RNTI) | 6 (configurable) Non-C-RNTI (INT-RNTI) |
| 0-0 | CSS in any BWP | USS in any BWP | | |
| 0-1 | | | | |
| 1-0 | CSS in any BWP | USS in any BWP | | |
| 1-1 | | | | |
| 2-0 | | | CSS with any configured CORESET ID in any configured BWP | |
| 2-1 | | | | SS with any configured CORESET ID in any configured BWP |
| 2-2 | CSS with any configured CORESET ID in any configured BWP | | | |
| 2-3 | CSS with any configured CORESET ID in any configured BWP | | | |

The size matching of DCI formats may be provided, for example, by padding or truncating one or more parts of a DCI payload between DCI formats for which size matching is provided. For example, zero padding of one or more parts of a DCI payload of a DCI format having a smaller payload size may be utilized for size matching according to embodiments. Additionally or alternatively, truncating one or more pares of a DCI payload of a DCI format having a larger payload size may be utilized for size matching according to embodiments.

Size matching implemented according to embodiments of the present disclosure may be based on a number of different criteria. For example, size matching may be based on radio resource control (RRC) configuration, configured DCI format sizes, on initial BWP, on active BWP, etc.

Figure 5A:
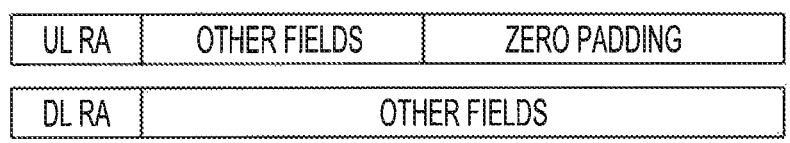
FIGS. 5A and 5B illustrate examples of size matching based on initial carrier bandwidth part according to aspects of the present disclosure.

As an example of size matching based on RRC configuration, where the DCI formats of the set of DCI formats for which dynamic size matching is performed comprise an uplink scheduling DCI format and a downlink scheduling DCI format, RRC configuration may be used for the dynamic size matching. RRC configuration for dynamic size formats to be size matched, and thereafter a total DCI payload size of the first DCI format may be size matched to a total DCI payload size of the second DCI format by padding or truncating information of the DCI payload of the first DCI format. A specific example of this size matching based on initial BWP is shown in FIG. 5A with respect to DCI format size matching between fallback DCI formats 0-0 and 1-0 in CSS and an initial downlink BWP. In the example illustrated in FIG. 5A, the uplink scheduling DCI format RA size is matched first to the downlink scheduling DCI format RA size, such as using zero padding or truncation with respect to the uplink scheduling DCI format RA. Then, the total uplink scheduling DCI format size is size matched to the downlink scheduling DCI format size, such as using zero padding or truncation with respect to other fields of the uplink scheduling DCI format.

Figure 5B:
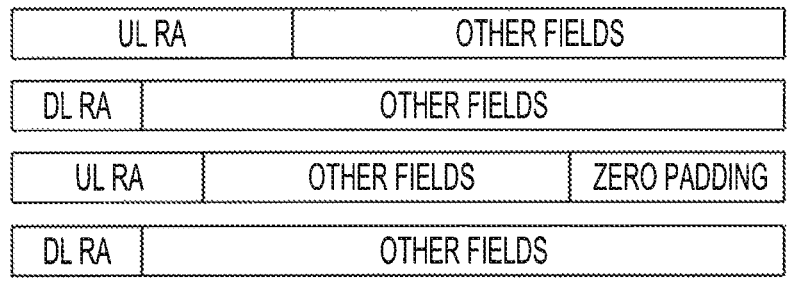

As another example of size matching based on initial BWP, a RA size of an initial BWP is used to attempt size matching a total DCI payload size of a first DCI format of the DCI formats to be size matched to a total DCI payload size of a second DCI format of the DCI formats to be size matched, and if the total DCI payload size of the first DCI format does not match the total DCI payload size of the second DCI format using the RA size of the initial BWP, size matching the total DCI payload size of the first DCI format to the total DCI payload size of the second DCI format by padding or truncating information of the DCI payload of the first DCI format. A specific example of this size matching based on initial BWP is shown in FIG. 5B with respect to DCI format size matching between fallback DCI formats 0-0 and 1-0 in CSS and an initial downlink BWP. In the example illustrated in FIG. 5B, the uplink scheduling DCI format RA size for the initial uplink BWP is allowed up to match the total uplink scheduling DCI format size to the downlink scheduling DCI format size. Thereafter, if the total uplink scheduling DCI format size still does not match the downlink scheduling DCI format size, the total uplink scheduling DCI format size may be size matched to the downlink scheduling DCI format size, such as using zero padding.

As an example of size matching based on active BWP, a RA size of a first DCI format may be size matched to a RA size of a second DCI format of the DCI formats to be size matched, and thereafter a total DCI payload size of the first DCI format may be size matched to a total DCI payload size of the second DCI format by padding or truncating information of the DCI payload of the first DCI format. DCI format size matching between fallback DCI formats 0-0 and 1-0 in USS and DCI format size matching between DCI formats 0-1 and 1-1 may provide specific examples of this size matching based on an active downlink BWP. For example, the uplink scheduling DCI format (e.g., 0-0 or 0-1) RA size may be matched first to the downlink scheduling DCI format RA (e.g., 1-0 or 1-1) size, such as using zero padding or truncation with respect to the uplink scheduling DCI format RA. Then, the total uplink scheduling DCI format (e.g., 0-0 or 0-1) size may be size matched to the downlink scheduling DCI format (e.g., 1-0 or 1-1) size, such as using zero padding or truncation with respect to other fields of the uplink scheduling DCI format. In another example, the downlink RA size may be matched with respect to the active downlink BWP and the uplink RA size may be matched with respect to the active uplink BWP. Then, the total DCI size matching for the DCI formats may be provided using zero padding from a smaller one to a larger one.

As another example of size matching based on active BWP, a RA size of an active BWP is used to attempt size matching a total DCI payload size of a first DCI format of the DCI formats to be size matched to a total DCI payload size of a second DCI format of the DCI formats to be size matched, and if the total DCI payload size of the first DCI format does not match the total DCI payload size of the second DCI format using the RA size of the active BWP, size matching the total DCI payload size of the first DCI format to the total DCI payload size of the second DCI format by padding or truncating information of the DCI payload of the first DCI format. DCI format size matching between fallback DCI formats 0-0 and 1-0 in USS and DCI format size matching between DCI formats 0-1 and 1-1 may provide specific examples of this size matching based on active BWP. For example, the uplink scheduling DCI format (e.g., 0-0 or 0-1) RA size for the active uplink BWP is allowed up to match the total uplink scheduling DCI format size to the downlink scheduling DCI format (e.g., 1-0 or 1-1) size. Thereafter, if the total uplink scheduling DCI format (e.g., 0-0 or 0-1) size still does not match the downlink scheduling DCI format (e.g., 1-0 or 1-1) size, the total uplink scheduling DCI format (e.g., 0-0 or 0-1) size may be size matched to the downlink scheduling DCI format (e.g., 1-0 or 1-1) size, such as using zero padding or truncation with respect to other fields of the uplink scheduling DCI format.

As yet another example of size matching based on active BWP, a downlink scheduling DCI format RA size of an active downlink BWP may be used in a total DCI payload size of a downlink scheduling DCI format of the at least two DCI formats, and an uplink scheduling DCI format RA size of an active uplink BWP may be used in a total DCI payload size of an uplink scheduling DCI format of the at least two DCI formats. In accordance with this example, if the total DCI payload size of the downlink scheduling DCI format and the payload size of the uplink scheduling DCI format do not match, the total DCI payload size of one of the downlink scheduling DCI format and the uplink scheduling DCI format may be size matched to the other one of the uplink scheduling DCI format and the downlink scheduling DCI format, such as by padding or truncating information of the DCI payload of the either or both of the uplink scheduling DCI format and downlink scheduling DCI format.

Although embodiments for providing size matching of DCI formats have been described with reference to DCI format matching for primary links (e.g., primary uplinks and/or primary downlinks), it should be appreciated that size matching of DCI formats may be provided with respect to supplemental links. For example, DCI format matching may be provided with respect to supplemental uplinks and/or supplemental downlinks.

As an example of DCI format size matching provided with respect to a supplemental link, DCI format size for a DCI format used with respect to a primary link and DCI format size for a DCI format used with respect to a supplemental link may be based on a maximum configured DCI size of the DCI format sizes for the primary and supplemental links. As a specific example, a first DCI format may be used with respect to a primary uplink and a second DCI format may be used with respect to a supplemental uplink corresponding to the primary uplink. In operation according to embodiments, size matching one of the first DCI format and the second DCI format to the other one of the second DCI format and the first DCI format may be provided based on a maximum configured DCI size for the other one of the second DCI format and the first DCI format.

As another example of DCI format size matching provided with respect to a supplemental link, DCI format size for a DCI format used with respect the supplemental link may be based on a configured DCI size for the DCI format used with respect to a corresponding primary link. As a specific example, a first DCI format may be used with respect to a primary downlink and a second DCI format may be used with respect to a supplemental uplink corresponding to a primary uplink associated with the primary downlink. In operation according to embodiments, size matching the second DCI format to the first DCI format may be provided based on a configured DCI size for the first DCI format.

As yet another example of DCI format size matching provided with respect to a supplemental link, DCI format size for a DCI format used with respect to a primary downlink, DCI format size for a DCI format used with respect to a primary uplink, and a DCI format size for a DCI format used with respect to a supplemental link may be based upon active BWP (e.g., active primary downlink BWP, active primary uplink BWP, and active supplemental link BWP). As a specific example, a first DCI format may be used with respect to a primary downlink, a second DCI format may be used with respect to a primary uplink corresponding to the primary downlink, and a third DCI format may be used with respect to a supplemental uplink corresponding to the primary uplink. In operation according to embodiments, size matching two of the first DCI format, the second DCI format, and the third DCI format to the remaining one of the third DCI format, the second DCI format, and the first DCI format may be based on a maximum configured DCI size for the remaining one of the third DCI format, the second DCI format, and the first DCI format (e.g., DCI format size is determined by the maximum DCI format size of the primary downlink DCI format, the primary uplink DCI format, and the supplemental uplink DCI format).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 2 and 4 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication using a plurality of downlink control information (DCI) formats, the method comprising:

determining a set of DCI formats of the plurality of DCI formats for concurrent use during wireless communications, wherein DCI formats of the plurality of DCI formats are configurable to be of different sizes; and size matching at least two DCI formats of the set of DCI formats that are configurable to be of different sizes to result in the set of DCI formats meeting one or more size restrictions with respect to a total number of DCI format sizes for concurrent use, wherein the one or more size restrictions with respect to the total number of DCI format sizes for concurrent use restrict a number of DCI format sizes for the set of DCI formats for concurrent use to both a first number of DCI sizes parameter and a second number of DCI sizes parameter.

2. The method of claim 1, wherein the first number of DCI sizes parameter is based on a total number of DCI format sizes per wireless communication slot, and wherein the second number of DCI sizes parameter is based on a total number of DCI format sizes for DCI formats used to carry DCI payload encoded using an identifier per wireless communication slot.

3. The method of claim 2, wherein the first number of DCI sizes parameter is less than a number of DCI formats of the plurality of DCI formats.

4. The method of claim 3, wherein the first number of DCI sizes parameter is greater than the second number of DCI sizes parameter.

5. The method of claim 4, wherein the first number of DCI sizes parameter is 4 and the second number of DCI sizes parameter is 3.

6. The method of claim 1, wherein the size matching is performed dynamically during wireless communications.

7. The method of claim 6, wherein performing the size matching dynamically comprises:
dynamically size matching the at least two DCI formats of the set of DCI formats on a wireless communication slot by wireless communication slot basis.

8. The method of claim 6, wherein performing the size matching dynamically comprises:
dynamically size matching the at least two DCI formats of the set of DCI formats based on a monitoring periodicity or monitoring occasion of a search space in which at least one DCI format of the set of DCI formats is searched.

9. The method of claim 8, wherein the dynamically size matching the at least two DCI formats of the set of DCI formats is based on a wireless communication slot in a monitoring period having a greatest number of DCI format sizes with respect to at least one of the first number of DCI sizes parameter and the second number of DCI sizes parameter, wherein the first number of DCI sizes parameter is based on a total number of DCI format sizes per wireless communication slot, and wherein the second number of DCI sizes parameter is based on a total number of DCI format sizes for DCI formats used to carry DCI payload encoded using an identifier per wireless communication slot.

10. The method of claim 6, wherein performing the size matching dynamically comprises:
dynamically size matching the at least two DCI formats of the set of DCI formats dynamically with respect to carrier bandwidth part (BWP) switching.

11. The method of claim 6, wherein the at least two DCI formats of the set of DCI formats for which dynamic size matching is performed comprise an uplink scheduling DCI format and a downlink scheduling DCI format, the method further comprising:
using radio resource control (RRC) configuration for the dynamic size matching.

12. The method of claim 6, further comprising:
determining that the set of DCI formats comprises a total number of DCI format sizes for DCI formats used to carry DCI payload encoded using an identifier per wireless communication slot greater than the second number of DCI sizes parameter, wherein the second number of DCI sizes parameter is based on a total number of DCI format sizes for DCI formats used to carry DCI payload encoded using an identifier per wireless communication slot; and
dynamically size matching the at least two DCI formats of the set of DCI formats based on a configured DCI size for the set of DCI formats.

13. The method of claim 6, further comprising:
determining that the set of DCI formats comprises a total number of DCI format sizes per wireless communication slot greater than the first number of DCI sizes parameter, wherein the first number of DCI sizes parameter is based on a total number of DCI format sizes per wireless communication slot; and
dynamically size matching the at least two DCI formats of the set of DCI formats based on a configured DCI size for the set of DCI formats.

14. The method of claim 6, further comprising:
padding information of a first DCI format of the at least two DCI formats for which size matching is dynamically provided with respect to a second DCI format of the at least two DCI formats.

15. The method of claim 6, further comprising:
truncating information of a first DCI format of the at least two DCI formats for which size matching is dynamically provided with respect to a second DCI format of the at least two DCI formats.

16. The method of claim 6, wherein the size matching comprises:
size matching a resource allocation (RA) size of a first DCI format of the at least two DCI formats to a RA size of a second DCI format of the at least two DCI formats; and
size matching a total DCI payload size of the first DCI format to a total DCI payload size of the second DCI format by padding or truncating information of the DCI payload of the first DCI format.

17. The method of claim 6, wherein the size matching comprises:
using a resource allocation (RA) size of an initial carrier bandwidth part (BWP) to attempt size matching a total DCI payload size of a first DCI format of the at least two DCI formats to a total DCI payload size of a second DCI format of the at least two DCI formats; and
if the total DCI payload size of the first DCI format does not match the total DCI payload size of the second DCI format using the RA size of the initial BWP, size matching the total DCI payload size of the first DCI format to the total DCI payload size of the second DCI format by padding or truncating information of the DCI payload of the first DCI format.

18. The method of claim 6, wherein the size matching comprises:
using a resource allocation (RA) size of an active carrier bandwidth part (BWP) to attempt size matching a total DCI payload size of a first DCI format of the at least two DCI formats to a total DCI payload size of a second DCI format of the at least two DCI formats; and if the total DCI payload size of the first DCI format does not match the total DCI payload size of the second DCI format using the RA size of the active BWP, size matching the total DCI payload size of the first DCI format to the total DCI payload size of the second DCI format by padding or truncating information of the DCI payload of the first DCI format.

19. The method of claim 6, wherein the size matching comprises:
using a downlink scheduling DCI format resource allocation (RA) size of an active downlink carrier bandwidth part (BWP) in a total DCI payload size of a downlink scheduling DCI format of the at least two DCI formats;
using an uplink scheduling DCI format RA size of an active uplink BWP in a total DCI payload size of an uplink scheduling DCI format of the at least two DCI formats; and
if the total DCI payload size of the downlink scheduling DCI format and of the uplink scheduling DCI format do not match, size matching the total DCI payload size of one of the downlink scheduling DCI format and the uplink scheduling DCI format to the other one of the uplink scheduling DCI format and the downlink scheduling DCI format by padding or truncating information of the DCI payload of one of the uplink scheduling DCI format or the downlink scheduling DCI format.

20. The method of claim 6, wherein the at least two DCI formats of the set of DCI formats for which dynamic size matching is performed comprise a first DCI format used with respect to an uplink and a second DCI format used with respect to a supplemental uplink corresponding to the uplink, the method comprising:
size matching one of the first DCI format and the second DCI format to the other one of the second DCI format and the first DCI format based on a configured DCI size for the other one of the second DCI format and the first DCI format.

21. The method of claim 6, wherein the at least two DCI formats of the set of DCI formats for which dynamic size matching is performed comprise a first DCI format used with respect to a downlink and a second DCI format used with respect to a supplemental uplink corresponding to an uplink associated with the downlink, the method comprising:
size matching the second DCI format to the first DCI format based on a configured DCI size for the first DCI format.

22. The method of claim 6, wherein the at least two DCI formats of the set of DCI formats for which dynamic size matching is performed comprise a first DCI format used with respect to a downlink, a second DCI format used with respect to an uplink corresponding to the downlink, and a third DCI format used with respect to a supplemental uplink corresponding to the uplink, the method comprising:
size matching two of the first DCI format, the second DCI format, and the third DCI format to the remaining one of the third DCI format, the second DCI format, and the first DCI format based on a configured DCI size for the remaining one of the third DCI format, the second DCI format, and the first DCI format.

23. The method of claim 6, wherein the set of DCI formats includes DCI formats 0-0 and 1-0 in common search space (CSS) and DCI formats 0-0 and 1-0 in UE-specific search space (USS), and wherein if a DCI size restriction of the one or more size restrictions with respect to the total number of DCI format sizes for concurrent use is not met with respect to the set of DCI formats then the size matching at least two DCI formats comprises size matching DCI formats 0-0 and 1-0 in USS to DCI formats 0-0 and 1-0 in CSS.

24. The method of claim 6, wherein the set of DCI formats includes DCI formats 0-0 and 1-0, and wherein the size matching at least two DCI formats comprises:
size matching a resource allocation (RA) size of an initial uplink bandwidth part (BWP) to attempt size matching a total DCI payload size of the DCI format 0-0 to a total DCI payload size of the DCI format 1-0 and
if the total DCI payload size of the DCI format 0-0 does not match the total DCI payload size of the DCI format 1-0 using the RA size of the initial uplink BWP then
size matching the total DCI payload size of the DCI format 0-0 to the total DCI payload size of the DCI format 1-0 by zero padding the DCI payload of the DCI format 0-0.

25. The method of claim 6, wherein the set of DCI formats includes DCI formats 0-0 and 1-0, and wherein the size matching at least two DCI formats comprises:
size matching a downlink resource allocation (RA) size with respect to an active downlink bandwidth part (BWP) and size matching an uplink RA size with respect to an active uplink BWP to attempt size matching a total DCI payload size of the DCI format 0-0 to a total DCI payload size of the DCI format 1-0 and
if the total DCI payload size of the DCI format 0-0 does not match the total DCI payload size of the DCI format 1-0 then
size matching the total DCI payload size of the DCI format 0-0 and the total DCI payload size of the DCI format 1-0 by zero padding the DCI payload of the DCI format 0-0 or the DCI format 1-0.

26. The method of claim 6, wherein the size matching at least two DCI formats comprises size matching a DCI format size for a DCI format used with respect to a primary link and size matching a DCI format size for a DCI format used with respect to a supplemental link based on a maximum configured DCI size of a configured DCI size for the primary link and a configured DCI size for the supplemental link.

27. The method of claim 6, wherein the size matching at least two DCI formats comprises size matching a DCI format size for a DCI format used with respect a supplemental link to a configured DCI size for a DCI format used with respect to a corresponding primary link.

28. The method of claim 6, wherein the size matching at least two DCI formats comprises size matching a DCI format size for a DCI format used with respect to a primary downlink, a DCI format size for a DCI format used with respect to a primary uplink, and a DCI format size for a DCI format used with respect to a supplemental link based upon an active bandwidth part (BWP).

29. The method of claim 1, wherein an identifier used for encoding DCI payload comprises a cell radio network temporary identifier (C-RNTI).

30. An apparatus configured for wireless communication using a plurality of downlink control information (DCI) formats, the apparatus comprising:
means for determining a set of DCI formats of the plurality of DCI formats for concurrent use during wireless communications, wherein DCI formats of the plurality of DCI formats are configurable to be of different sizes; and
means for size matching at least two DCI formats of the set of DCI formats that are configurable to be of different sizes to result in the set of DCI formats meeting one or more size restrictions with respect to a total number of DCI format sizes for concurrent use, wherein the one or more size restrictions with respect to the total number of DCI format sizes for concurrent use restrict a number of DCI format sizes for the set of DCI formats for concurrent use to both a first number of DCI sizes parameter and a second number of DCI sizes parameter.

31. The apparatus of claim 30, wherein the first number of DCI sizes parameter is based on a total number of DCI format sizes per wireless communication slot, and wherein the second number of DCI sizes parameter is based on a total number of DCI format sizes for DCI formats used to carry DCI payload encoded using an identifier per wireless communication slot.

32. The apparatus of claim 31, wherein the first number of DCI sizes parameter is less than a number DCI formats of the plurality of DCI formats.

33. The apparatus of claim 32, wherein the first number of DCI sizes parameter is greater than the second number of DCI sizes parameter.

34. The apparatus of claim 30, wherein the size matching is performed dynamically during the wireless communications.

35. The apparatus of claim 34, further comprising:
means for dynamically size matching the at least two DCI formats of the set of DCI formats based on a monitoring periodicity or monitoring occasion of a search space in which at least one DCI format of the set of DCI formats is searched.

36. The apparatus of claim 34, further comprising:
means for dynamically size matching the at least two DCI formats of the set of DCI formats dynamically with respect to carrier bandwidth part (BWP) switching.

37. The apparatus of claim 34, wherein the at least two DCI formats of the set of DCI formats for which dynamic size matching is performed comprise an uplink scheduling DCI format and a downlink scheduling DCI format, the apparatus further comprising:
means for using radio resource control (RRC) configuration for the dynamic size matching.

38. The apparatus of claim 34, further comprising:
means for determining that the set of DCI formats comprises a total number of DCI format sizes for DCI formats used to carry DCI payload encoded using an identifier per wireless communication slot greater than the second number of DCI sizes parameter, wherein the second number of DCI sizes parameter is based on a total number of DCI format sizes for DCI formats used to carry DCI payload encoded using an identifier per wireless communication slot; and
means for dynamically size matching the at least two DCI formats of the set of DCI formats based on a configured DCI size for the set of DCI formats.

39. The apparatus of claim 34, further comprising:
means for determining that the set of DCI formats comprises a total number of DCI format sizes per wireless communication slot greater than the first number of DCI sizes parameter, wherein the first number of DCI sizes parameter is based on a total number of DCI format sizes per wireless communication slot; and
means for dynamically size matching the at least two DCI formats of the set of DCI formats based on a configured DCI size for the set of DCI formats.

40. The apparatus of claim 34, wherein the means for size matching comprises:

means for size matching a resource allocation (RA) size of a first DCI format of the at least two DCI formats to a RA size of a second DCI format of the at least two DCI formats; and
means for size matching a total DCI payload size of the first DCI format to a total DCI payload size of the second DCI format by padding or truncating information of the DCI payload of the first DCI format.

41. The apparatus of claim 34, wherein the means for size matching comprises:
means for using a resource allocation (RA) size of an initial carrier bandwidth part (BWP) to attempt size matching a total DCI payload size of a first DCI format of the at least two DCI formats to a total DCI payload size of a second DCI format of the at least two DCI formats; and
means for size matching the total DCI payload size of the first DCI format to the total DCI payload size of the second DCI format by padding or truncating information of the DCI payload of the first DCI format if the total DCI payload size of the first DCI format does not match the total DCI payload size of the second DCI format using the RA size of the initial BWP.

42. The apparatus of claim 34, wherein the means for size matching comprises:
means for using a resource allocation (RA) size of an active carrier bandwidth part (BWP) to attempt size matching a total DCI payload size of a first DCI format of the at least two DCI formats to a total DCI payload size of a second DCI format of the at least two DCI formats; and
means for size matching the total DCI payload size of the first DCI format to the total DCI payload size of the second DCI format by padding or truncating information of the DCI payload of the first DCI format if the total DCI payload size of the first DCI format does not match the total DCI payload size of the second DCI format using the RA size of the active BWP.

43. The apparatus of claim 34, wherein the means for size matching comprises:
means for using a downlink scheduling DCI format resource allocation (RA) size of an active downlink carrier bandwidth part (BWP) in a total DCI payload size of a downlink scheduling DCI format of the at least two DCI formats;
means for using an uplink scheduling DCI format RA size of an active uplink BWP in a total DCI payload size of an uplink scheduling DCI format of the at least two DCI formats; and
means for size matching the total DCI payload size of one of the downlink scheduling DCI format and the uplink scheduling DCI format to the other one of the uplink scheduling DCI format and the downlink scheduling DCI format by padding or truncating information of the DCI payload of one of the uplink scheduling DCI format or the downlink scheduling DCI format if the total DCI payload size of the downlink scheduling DCI format and the total DCI payload size of the uplink scheduling DCI format do not match.

44. The apparatus of claim 34, wherein the at least two DCI formats of the set of DCI formats for which dynamic size matching is performed comprise a first DCI format used with respect to an uplink and a second DCI format used with respect to a supplemental uplink corresponding to the uplink, the apparatus comprising:
means for size matching one of the first DCI format and the second DCI format to the other one of the second DCI format and the first DCI format based on a configured DCI size for the other one of the second DCI format and the first DCI format.

45. The apparatus of claim 34, wherein the at least two DCI formats of the set of DCI formats for which dynamic size matching is performed comprise a first DCI format used with respect to a downlink and a second DCI format used with respect to a supplemental uplink corresponding to an uplink associated with the downlink, the apparatus comprising:
 means for size matching the second DCI format to the first DCI format based on a configured DCI size for the first DCI format.

46. The apparatus of claim 34, wherein the at least two DCI formats of the set of DCI formats for which dynamic size matching is performed comprise a first DCI format used with respect to a downlink, a second DCI format used with respect to an uplink corresponding to the downlink, and a third DCI format used with respect to a supplemental uplink corresponding to the uplink, the apparatus comprising:
 means for size matching two of the first DCI format, the second DCI format, and the third DCI format to the remaining one of the third DCI format, the second DCI format, and the first DCI format based on a configured DCI size for the remaining one of the third DCI format, the second DCI format, and the first DCI format.

47. The apparatus of claim 34, wherein the set of DCI formats includes DCI formats 0-0 and 1-0 in common search space (CSS) and DCI formats 0-0 and 1-0 in UE-specific search space (USS), and wherein if a DCI size restriction of the one or more size restrictions with respect to the total number of DCI format sizes for concurrent use is not met with respect to the set of DCI formats then the means for size matching at least two DCI formats size matches DCI formats 0-0 and 1-0 in USS to DCI formats 0-0 and 1-0 in CSS.

48. The apparatus of claim 34, wherein the set of DCI formats includes DCI formats 0-0 and 1-0, and wherein the means for size matching at least two DCI formats
 size matches a resource allocation (RA) size of an initial uplink bandwidth part (BWP) to attempt size matching a total DCI payload size of the DCI format 0-0 to a total DCI payload size of the DCI format 1-0 and
 if the total DCI payload size of the DCI format 0-0 does not match the total DCI payload size of the DCI format 1-0 using the RA size of the initial uplink BWP then
  size matches the total DCI payload size of the DCI format 0-0 to the total DCI payload size of the DCI format 1-0 by zero padding the DCI payload of the DCI format 0-0.

49. The apparatus of claim 34, wherein the set of DCI formats includes DCI formats 0-0 and 1-0, and wherein the means for size matching at least two DCI formats
 size matches a downlink resource allocation (RA) size with respect to an active downlink bandwidth part (BWP) and size matches an uplink RA size with respect to an active uplink BWP to attempt size matching a total DCI payload size of the DCI format 0-0 to a total DCI payload size of the DCI format 1-0 and
 if the total DCI payload size of the DCI format 0-0 does not match the total DCI payload size of the DCI format 1-0 then
  size matches the total DCI payload size of the DCI format 0-0 and the total DCI payload size of the DCI format 1-0 by zero padding the DCI payload of the DCI format 0-0 or the DCI format 1-0.

50. The apparatus of claim 34, wherein the means for size matching at least two DCI formats size matches a DCI format size for a DCI format used with respect to a primary link and size matches a DCI format size for a DCI format used with respect to a supplemental link based on a maximum configured DCI size of a configured DCI size for the primary link and a configured DCI size for the supplemental link.

51. The apparatus of claim 34, wherein the means for size matching at least two DCI formats size matches a DCI format size for a DCI format used with respect a supplemental link to a configured DCI size for a DCI format used with respect to a corresponding primary link.

52. The apparatus of claim 34, wherein the means for size matching at least two DCI formats size matches a DCI format size for a DCI format used with respect to a primary downlink, a DCI format size for a DCI format used with respect to a primary uplink, and a DCI format size for a DCI format used with respect to a supplemental link based upon an active bandwidth part (BWP).

53. The apparatus of claim 30, wherein an identifier used for encoding DCI payload comprises a cell radio network temporary identifier (C-RNTI).

54. A non-transitory computer-readable medium having program code recorded thereon for wireless communication using a plurality of downlink control information (DCI) formats, the program code comprising:
 program code executable by a computer for causing the computer to
  determine a set of DCI formats of the plurality of DCI formats for concurrent use during wireless communications, wherein DCI formats of the plurality of DCI formats are configurable to be of different sizes; and
  size match at least two DCI formats of the set of DCI formats that are configurable to be of different sizes to result in the set of DCI formats meeting one or more size restrictions with respect to a total number of DCI format sizes for concurrent use, wherein the one or more size restrictions with respect to the total number of DCI format sizes for concurrent use restrict a number of DCI format sizes for the set of DCI formats for concurrent use to both a first number of DCI sizes parameter and a second number of DCI sizes parameter.

55. The non-transitory computer-readable medium of claim 54, wherein the first number of DCI sizes parameter is based on a total number of DCI format sizes per wireless communication slot, and wherein the second number of DCI sizes parameter is based on a total number of DCI format sizes for DCI formats used to carry DCI payload encoded using an identifier per wireless communication slot.

56. The non-transitory computer-readable medium of claim 55, wherein the first number of DCI sizes parameter is less than a number DCI formats of the plurality of DCI formats.

57. The non-transitory computer-readable medium of claim 56, wherein the first number of DCI sizes parameter is greater than the second number of DCI sizes parameter.

58. The non-transitory computer-readable medium of claim 54, wherein the size match is performed dynamically during wireless communications.

59. The non-transitory computer-readable medium of claim 58, wherein the program code causes the computer to dynamically size match the at least two DCI formats of the set of DCI formats based on a monitoring periodicity or monitoring occasion of a search space in which at least one DCI format of the set of DCI formats is searched.

60. The non-transitory computer-readable medium of claim 58, wherein the program code causes the computer to
dynamically size match the at least two DCI formats of the set of DCI formats dynamically with respect to carrier bandwidth part (BWP) switching.

61. The non-transitory computer-readable medium of claim 58, wherein the at least two DCI formats of the set of DCI formats for which dynamic size matching is performed comprise an uplink scheduling DCI format and a downlink scheduling DCI format, wherein the program code further causes the computer to
use radio resource control (RRC) configuration for the dynamic size matching.

62. The non-transitory computer-readable medium of claim 58, wherein the program code causes the computer to
determine that the set of DCI formats comprises a total number of DCI format sizes for DCI formats used to carry DCI payload encoded using an identifier per wireless communication slot greater than the second number of DCI sizes parameter, wherein the second number of DCI sizes parameter is based on a total number of DCI format sizes for DCI formats used to carry DCI payload encoded using an identifier per wireless communication slot; and
dynamically size match the at least two DCI formats of the set of DCI formats based on a configured DCI size for the set of DCI formats.

63. The non-transitory computer-readable medium of claim 58, wherein the program code causes the computer to
determine that the set of DCI formats comprises a total number of DCI format sizes per wireless communication slot greater than the first number of DCI sizes parameter, wherein the first number of DCI sizes parameter is based on a total number of DCI format sizes per wireless communication slot; and
dynamically size match the at least two DCI formats of the set of DCI formats based on a configured DCI size for the set of DCI formats.

64. The non-transitory computer-readable medium of claim 58, wherein the program code causes the computer to
size match a resource allocation (RA) size of a first DCI format of the at least two DCI formats to a RA size of a second DCI format of the at least two DCI formats; and
size match a total DCI payload size of the first DCI format to a total DCI payload size of the second DCI format by padding or truncating information of the DCI payload of the first DCI format.

65. The non-transitory computer-readable medium of claim 58, wherein the program code causes the computer to
use a resource allocation (RA) size of an initial carrier bandwidth part (BWP) to attempt size matching a total DCI payload size of a first DCI format of the at least two DCI formats to a total DCI payload size of a second DCI format of the at least two DCI formats; and
size match the total DCI payload size of the first DCI format to the total DCI payload size of the second DCI format by padding or truncating information of the DCI payload of the first DCI format if the total DCI payload size of the first DCI format does not match the total DCI payload size of the second DCI format using the RA size of the initial BWP.

66. The non-transitory computer-readable medium of claim 58, wherein the program code causes the computer to
use a resource allocation (RA) size of an active carrier bandwidth part (BWP) to attempt size matching a total DCI payload size of a first DCI format of the at least two DCI formats to a total DCI payload size of a second DCI format of the at least two DCI formats; and
size match the total DCI payload size of the first DCI format to the total DCI payload size of the second DCI format by padding or truncating information of the DCI payload of the first DCI format if the total DCI payload size of the first DCI format does not match the total DCI payload size of the second DCI format using the RA size of the active BWP.

67. The non-transitory computer-readable medium of claim 58, wherein the program code causes the computer to
use a downlink scheduling DCI format resource allocation (RA) size of an active downlink carrier bandwidth part (BWP) in a total DCI payload size of a downlink scheduling DCI format of the at least two DCI formats;
use an uplink scheduling DCI format RA size of an active uplink BWP in a total DCI payload size of an uplink scheduling DCI format of the at least two DCI formats; and
size match the total DCI payload size of one of the downlink scheduling DCI format and the uplink scheduling DCI format to the other one of the uplink scheduling DCI format and the downlink scheduling DCI format by padding or truncating information of the DCI payload of one of the uplink scheduling DCI format or the downlink scheduling DCI format if the total DCI payload size of the downlink scheduling DCI format and the total DCI payload size of the uplink scheduling DCI format do not match.

68. The non-transitory computer-readable medium of claim 58, wherein the at least two DCI formats of the set of DCI formats for which dynamic size matching is performed comprise a first DCI format used with respect to an uplink and a second DCI format used with respect to a supplemental uplink corresponding to the uplink, wherein the program code causes the computer to
size match one of the first DCI format and the second DCI format to the other one of the second DCI format and the first DCI format based on a configured DCI size for the other one of the second DCI format and the first DCI format.

69. The non-transitory computer-readable medium of claim 58, wherein the at least two DCI formats of the set of DCI formats for which dynamic size matching is performed comprise a first DCI format used with respect to a downlink and a second DCI format used with respect to a supplemental uplink corresponding to an uplink associated with the downlink, wherein the program code causes the computer to
size match the second DCI format to the first DCI format based on a configured DCI size for the first DCI format.

70. The non-transitory computer-readable medium of claim 58, wherein the at least two DCI formats of the set of DCI formats for which dynamic size matching is performed comprise a first DCI format used with respect to a downlink, a second DCI format used with respect to an uplink corresponding to the downlink, and a third DCI format used with respect to a supplemental uplink corresponding to the uplink, wherein the program code causes the computer to
size match two of the first DCI format, the second DCI format, and the third DCI format to the remaining one of the third DCI format, the second DCI format, and the first DCI format based on a configured DCI size for the remaining one of the third DCI format, the second DCI format, and the first DCI format.

71. The non-transitory computer-readable medium of claim 58, wherein the set of DCI formats includes DCI formats 0-0 and 1-0 in common search space (CSS) and DCI formats 0-0 and 1-0 in UE-specific search space (USS), and wherein if a DCI size restriction of the one or more size restrictions with respect to the total number of DCI format sizes for concurrent use is not met with respect to the set of DCI formats then size matching at least two DCI formats comprises size matching DCI formats 0-0 and 1-0 in USS to DCI formats 0-0 and 1-0 in CSS.

72. The non-transitory computer-readable medium of claim 58, wherein the set of DCI formats includes DCI formats 0-0 and 1-0, and wherein size matching at least two DCI formats comprises:
    size matching a resource allocation (RA) size of an initial uplink bandwidth part (BWP) to attempt size matching a total DCI payload size of the DCI format 0-0 to a total DCI payload size of the DCI format 1-0 and
        if the total DCI payload size of the DCI format 0-0 does not match the total DCI payload size of the DCI format 1-0 using the RA size of the initial uplink BWP then
            size matching the total DCI payload size of the DCI format 0-0 to the total DCI payload size of the DCI format 1-0 by zero padding the DCI payload of the DCI format 0-0.

73. The non-transitory computer-readable medium of claim 58, wherein the set of DCI formats includes DCI formats 0-0 and 1-0, and wherein size matching at least two DCI formats comprises:
    size matching a downlink resource allocation (RA) size with respect to an active downlink bandwidth part (BWP) and size matching an uplink RA size with respect to an active uplink BWP to attempt size matching a total DCI payload size of the DCI format 0-0 to a total DCI payload size of the DCI format 1-0 and
        if the total DCI payload size of the DCI format 0-0 does not match the total DCI payload size of the DCI format 1-0 then
            size matching the total DCI payload size of the DCI format 0-0 and the total DCI payload size of the DCI format 1-0 by zero padding the DCI payload of the DCI format 0-0 or the DCI format 1-0.

74. The non-transitory computer-readable medium of claim 58, wherein size matching at least two DCI formats comprises size matching a DCI format size for a DCI format used with respect to a primary link and size matching a DCI format size for a DCI format used with respect to a supplemental link based on a maximum configured DCI size of a configured DCI size for the primary link and a configured DCI size for the supplemental link.

75. The non-transitory computer-readable medium of claim 58, wherein size matching at least two DCI formats comprises size matching a DCI format size for a DCI format used with respect a supplemental link to a configured DCI size for a DCI format used with respect to a corresponding primary link.

76. The non-transitory computer-readable medium of claim 58, wherein size matching at least two DCI formats comprises size matching a DCI format size for a DCI format used with respect to a primary downlink, a DCI format size for a DCI format used with respect to a primary uplink, and a DCI format size for a DCI format used with respect to a supplemental link based upon an active bandwidth part (BWP).

77. The non-transitory computer-readable medium of claim 54, wherein an identifier used for encoding DCI payload comprises a cell radio network temporary identifier (C-RNTI).

78. An apparatus configured for wireless communication using a plurality of downlink control information (DCI) formats, the apparatus comprising:
    at least one processor; and
    a memory coupled to the at least one processor, wherein the at least one processor is configured:
        to determine a set of DCI formats of the plurality of DCI formats for concurrent use during wireless communications, wherein DCI formats of the plurality of DCI formats are configurable to be of different sizes; and
        to size match at least two DCI formats of the set of DCI formats that are configurable to be of different sizes to result in the set of DCI formats meeting one or more size restrictions with respect to a total number of DCI format sizes for concurrent use, wherein the one or more size restrictions with respect to the total number of DCI format sizes for concurrent use restrict a number of DCI format sizes for the set of DCI formats for concurrent use to both a first number of DCI sizes parameter and a second number of DCI sizes parameter.

79. The apparatus of claim 78, wherein the first number of DCI sizes parameter is based on a total number of DCI format sizes per wireless communication slot, and wherein the second number of DCI sizes parameter is based on a total number of DCI format sizes for DCI formats used to carry DCI payload encoded using an identifier per wireless communication slot.

80. The apparatus of claim 79, wherein the first number of DCI sizes parameter is less than a number DCI formats of the plurality of DCI formats.

81. The apparatus of claim 80, wherein the first number of DCI sizes parameter is greater than the second number of DCI sizes parameter.

82. The apparatus of claim 78, wherein the size match is performed dynamically during the wireless communications.

83. The apparatus of claim 82, wherein the at least one processor is configured:
    to dynamically size match the at least two DCI formats of the set of DCI formats based on a monitoring periodicity or monitoring occasion of a search space in which at least one DCI format of the set of DCI formats is searched.

84. The apparatus of claim 82, wherein the at least one processor is configured:
    to dynamically size match the at least two DCI formats of the set of DCI formats dynamically with respect to carrier bandwidth part (BWP) switching.

85. The apparatus of claim 82, wherein the at least two DCI formats of the set of DCI formats for which dynamic size matching is performed comprise an uplink scheduling DCI format and a downlink scheduling DCI format, wherein the at least one processor is configured:
    to use radio resource control (RRC) configuration for the dynamic size matching.

86. The apparatus of claim 82, wherein the at least one processor is configured:
    to determine that the set of DCI formats comprises a total number of DCI format sizes for DCI formats used to carry DCI payload encoded using an identifier per wireless communication slot greater than the second number of DCI sizes parameter, wherein the second number of DCI sizes parameter is based on a total number of DCI format sizes for DCI formats used to carry DCI payload encoded using an identifier per wireless communication slot; and dynamically size match the at least two DCI formats of the set of DCI formats based on a configured DCI size for the set of DCI formats.

87. The apparatus of claim 82, wherein the at least one processor is configured:

to determine that the set of DCI formats comprises a total number of DCI format sizes per wireless communication slot greater than first number of DCI sizes parameter, wherein the first number of DCI sizes parameter is based on a total number of DCI format sizes per wireless communication slot; and to dynamically size match the at least two DCI formats of the set of DCI formats based on a configured DCI size for the set of DCI formats.

88. The apparatus of claim 82, wherein the at least one processor is configured:

to size match a resource allocation (RA) size of a first DCI format of the at least two DCI formats to a RA size of a second DCI format of the at least two DCI formats; and size match a total DCI payload size of the first DCI format to a total DCI payload size of the second DCI format by padding or truncating information of the DCI payload of the first DCI format.

89. The apparatus of claim 82, wherein the at least one processor is configured:

to use a resource allocation (RA) size of an initial carrier bandwidth part (BWP) to attempt size matching a total DCI payload size of a first DCI format of the at least two DCI formats to a total DCI payload size of a second DCI format of the at least two DCI formats; and to size match the total DCI payload size of the first DCI format to the total DCI payload size of the second DCI format by padding or truncating information of the DCI payload of the first DCI format if the total DCI payload size of the first DCI format does not match the total DCI payload size of the second DCI format using the RA size of the initial BWP.

90. The apparatus of claim 82, wherein the at least one processor is configured:

to use a resource allocation (RA) size of an active carrier bandwidth part (BWP) to attempt size matching a total DCI payload size of a first DCI format of the at least two DCI formats to a total DCI payload size of a second DCI format of the at least two DCI formats; and to size match the total DCI payload size of the first DCI format to the total DCI payload size of the second DCI format by padding or truncating information of the DCI payload of the first DCI format if the total DCI payload size of the first DCI format does not match the total DCI payload size of the second DCI format using the RA size of the active BWP.

91. The apparatus of claim 82, wherein the at least one processor is configured:

to use a downlink scheduling DCI format resource allocation (RA) size of an active downlink carrier bandwidth part (BWP) in a total DCI payload size of a downlink scheduling DCI format of the at least two DCI formats;

to use an uplink scheduling DCI format RA size of an active uplink BWP in a total DCI payload size of an uplink scheduling DCI format of the at least two DCI formats; and to size match the total DCI payload size of one of the downlink scheduling DCI format and the uplink scheduling DCI format to the other one of the uplink scheduling DCI format and the downlink scheduling DCI format by padding or truncating information of the DCI payload of one of the uplink scheduling DCI format or the downlink scheduling DCI format if the total DCI payload size of the downlink scheduling DCI format and the total DCI payload size of the uplink scheduling DCI format do not match.

92. The apparatus of claim 82, wherein the at least two DCI formats of the set of DCI formats for which dynamic size matching is performed comprise a first DCI format used with respect to an uplink and a second DCI format used with respect to a supplemental uplink corresponding to the uplink, wherein the at least one processor is configured:

to size match one of the first DCI format and the second DCI format to the other one of the second DCI format and the first DCI format based on a configured DCI size for the other one of the second DCI format and the first DCI format.

93. The apparatus of claim 82, wherein the at least two DCI formats of the set of DCI formats for which dynamic size matching is performed comprise a first DCI format used with respect to a downlink and a second DCI format used with respect to a supplemental uplink corresponding to an uplink associated with the downlink, wherein the at least one processor is configured:

to size match the second DCI format to the first DCI format based on a configured DCI size for the first DCI format.

94. The apparatus of claim 82, wherein the at least two DCI formats of the set of DCI formats for which dynamic size matching is performed comprise a first DCI format used with respect to a downlink, a second DCI format used with respect to an uplink corresponding to the downlink, and a third DCI format used with respect to a supplemental uplink corresponding to the uplink, wherein the at least one processor is configured:

to size match two of the first DCI format, the second DCI format, and the third DCI format to the remaining one of the third DCI format, the second DCI format, and the first DCI format based on a configured DCI size for the remaining one of the third DCI format, the second DCI format, and the first DCI format.

95. The apparatus of claim 82, wherein the set of DCI formats includes DCI formats 0-0 and 1-0 in common search space (CSS) and DCI formats 0-0 and 1-0 in UE-specific search space (USS), wherein the at least one processor is configured:

size match at least two DCI formats comprises size matching DCI formats 0-0 and 1-0 in USS to DCI formats 0-0 and 1-0 in CSS if a DCI size restriction of the one or more size restrictions with respect to the total number of DCI format sizes for concurrent use is not met with respect to the set of DCI formats.

96. The apparatus of claim 82, wherein the set of DCI formats includes DCI formats 0-0 and 1-0, and wherein the at least one processor configured to size match at least two DCI formats is configured to:

size match a resource allocation (RA) size of an initial uplink bandwidth part (BWP) to attempt size matching a total DCI payload size of the DCI format 0-0 to a total DCI payload size of the DCI format 1-0 and if the total DCI payload size of the DCI format 0-0 does not match the total DCI payload size of the DCI format 1-0 using the RA size of the initial uplink BWP then size match the total DCI payload size of the DCI format 0-0 to the total DCI payload size of the DCI format 1-0 by zero padding the DCI payload of the DCI format 0-0.

97. The apparatus of claim 82, wherein the set of DCI formats includes DCI formats 0-0 and 1-0, and wherein the at least one processor configured to size match at least two DCI formats is configured to:

size match a downlink resource allocation (RA) size with respect to an active downlink bandwidth part (BWP) and size match an uplink RA size with respect to an active uplink BWP to attempt size matching a total DCI payload size of the DCI format 0-0 to a total DCI payload size of the DCI format 1-0 and if the total DCI payload size of the DCI format 0-0 does not match the total DCI payload size of the DCI format 1-0 then size match the total DCI payload size of the DCI format 0-0 and the total DCI payload size of the DCI format 1-0 by zero padding the DCI payload of the DCI format 0-0 or the DCI format 1-0.

98. The apparatus of claim 82, wherein the at least one processor configured to size match at least two DCI formats is configured to:

size match a DCI format size for a DCI format used with respect to a primary link and size match a DCI format size for a DCI format size for a DCI format used with respect to a supplemental link based on a maximum configured DCI size of a configured DCI size for the primary link and a configured DCI size for the supplemental link.

99. The apparatus of claim 82, wherein the at least one processor configured to size match at least two DCI formats is configured to:

size match a DCI format size for a DCI format used with respect a supplemental link to a configured DCI size for a DCI format used with respect to a corresponding primary link.

100. The apparatus of claim 82, wherein the at least one processor configured to size match at least two DCI formats is configured to:

size match a DCI format size for a DCI format used with respect to a primary downlink, a DCI format size for a DCI format used with respect to a primary uplink, and a DCI format size for a DCI format used with respect to a supplemental link based upon an active bandwidth part (BWP).

101. The apparatus of claim 78, wherein an identifier used for encoding DCI payload comprises a cell radio network temporary identifier (C-RNTI).

* * * * *